(12) United States Patent
Nemet

(10) Patent No.: US 11,060,924 B2
(45) Date of Patent: Jul. 13, 2021

(54) THERMOCHROMIC INK INDICIA FOR ACTIVATABLE QUALITY LABELS

(71) Applicant: Varcode Ltd., Raanana (IL)

(72) Inventor: Yaron Nemet, Kdumim (IL)

(73) Assignee: Varcode Ltd., Rosh Ha'ayin (IL)

( * ) Notice: Subject to any disclaimer, the term of this patent is extended or adjusted under 35 U.S.C. 154(b) by 903 days.

(21) Appl. No.: 15/574,353

(22) PCT Filed: May 18, 2016

(86) PCT No.: PCT/IL2016/050526
§ 371 (c)(1),
(2) Date: Nov. 15, 2017

(87) PCT Pub. No.: WO2016/185474
PCT Pub. Date: Nov. 24, 2016

(65) Prior Publication Data
US 2018/0136052 A1   May 17, 2018

Related U.S. Application Data

(60) Provisional application No. 62/163,193, filed on May 18, 2015.

(51) Int. Cl.
*G01K 11/12* (2021.01)
*G09F 3/00* (2006.01)
(Continued)

(52) U.S. Cl.
CPC ............. *G01K 11/12* (2013.01); *G01K 3/04* (2013.01); *G09F 3/0294* (2013.01); *G06K 19/0614* (2013.01); *G09F 2003/0211* (2013.01)

(58) Field of Classification Search
CPC ........ G01K 11/12; G01K 3/04; G09F 3/0294; G09F 2003/0211; G06K 19/0614
See application file for complete search history.

(56) References Cited

U.S. PATENT DOCUMENTS 4,057,029 A   11/1977   Seiter
4,059,407 A   11/1977   Hochstrasser
(Continued)

FOREIGN PATENT DOCUMENTS

CN   1720180   1/2006
CN   1914621   2/2007
(Continued)

OTHER PUBLICATIONS

An Office Action together with an English Summary dated May 8, 2019, which issued during the prosecution of Chinese Patent Application No. 201680032715.2.
(Continued)

*Primary Examiner* — Nimeshkumar D Patel
*Assistant Examiner* — Tania Courson
(74) *Attorney, Agent, or Firm* — Fish & Richardson P.C.

(57) ABSTRACT

An activatable quality label operative to provide an indication of exceedance of a temperature threshold following activation thereof at a temperature less than or equal to an activation temperature, including a readable indicator located on the quality label and operative, following activation of the quality label at or below the activation temperature, to readably indicate exceedance of the temperature threshold, an actuator element operative to activate the quality label and indicia at least partially formed by thermochromic ink, the thermochromic ink having a first visual appearance at temperatures less than or equal to the activation temperature and a second visual appearance at temperatures above the activation temperature, such that a visual appearance of the indicia is indicative of whether the quality label is at a temperature less than or equal to the activation temperature and hence may be activated.

20 Claims, 7 Drawing Sheets

(51) Int. Cl.
  *G01K 3/04* (2006.01)
  *G06K 19/06* (2006.01)
  *G09F 3/02* (2006.01)

(56) References Cited

U.S. PATENT DOCUMENTS

| | | |
|---|---|---|
| RE31,586 E | 5/1984 | Magnussen |
| 4,674,065 A | 6/1987 | Lange et al. |
| 5,053,339 A | 10/1991 | Patel |
| 5,084,143 A | 1/1992 | Smith |
| 5,085,802 A | 2/1992 | Jalinski |
| 5,146,405 A | 9/1992 | Church et al. |
| 5,202,677 A | 4/1993 | Parker et al. |
| 5,254,473 A | 10/1993 | Patel |
| 5,369,577 A | 11/1994 | Kadashevich et al. |
| 5,451,932 A | 9/1995 | Wunderlich et al. |
| 5,485,372 A | 1/1996 | Golding et al. |
| 5,499,597 A | 3/1996 | Kronberg |
| 5,591,952 A | 1/1997 | Krichever |
| 5,600,119 A | 2/1997 | Dvorkis |
| 5,617,488 A | 4/1997 | Hong et al. |
| 5,634,195 A | 5/1997 | Sawyer |
| 5,659,771 A | 8/1997 | Golding |
| 5,752,227 A | 5/1998 | Lyberg |
| 5,805,245 A | 9/1998 | Davis |
| 5,822,728 A | 10/1998 | Applebaum et al. |
| 5,828,991 A | 10/1998 | Skiena et al. |
| 5,841,285 A | 11/1998 | Bailey |
| 5,882,116 A | 3/1999 | Backus |
| 5,895,075 A | 4/1999 | Edwards |
| 5,899,973 A | 5/1999 | Bandara et al. |
| 5,902,982 A | 5/1999 | Lappe |
| 5,907,839 A | 5/1999 | Roth |
| 5,936,508 A | 8/1999 | Parker |
| 5,956,739 A | 9/1999 | Golding et al. |
| 6,006,221 A | 12/1999 | Liddy et al. |
| 6,009,400 A | 12/1999 | Blackman |
| 6,036,092 A | 3/2000 | Lappe |
| 6,085,206 A | 7/2000 | Domini et al. |
| 6,098,034 A | 8/2000 | Razin et al. |
| 6,154,722 A | 11/2000 | Bellegarda |
| 6,173,261 B1 | 1/2001 | Arai et al. |
| 6,190,610 B1 | 2/2001 | Goldsmith et al. |
| 6,214,623 B1 | 4/2001 | Simons et al. |
| 6,272,242 B1 | 8/2001 | Saitoh et al. |
| 6,293,470 B1 | 9/2001 | Asplund |
| 6,314,400 B1 | 11/2001 | Klakow |
| 6,335,922 B1 | 1/2002 | Tiedemann et al. |
| 6,366,759 B1 | 4/2002 | Burstein et al. |
| 6,424,983 B1 | 7/2002 | Schabes et al. |
| 6,456,972 B1 | 9/2002 | Gladstein et al. |
| 6,479,016 B1 | 11/2002 | Goldsmith |
| 6,495,368 B1 | 12/2002 | Wallach |
| 6,544,925 B1 | 4/2003 | Prusik et al. |
| 6,685,094 B2 | 2/2004 | Cameron |
| 6,751,584 B2 | 6/2004 | Bangalore |
| 6,758,397 B2 | 7/2004 | Catan |
| 6,920,420 B2 | 7/2005 | Lin |
| 6,982,640 B2 | 1/2006 | Lindsay |
| 7,017,806 B2 | 3/2006 | Peterson |
| 7,020,338 B1 | 3/2006 | Cumbee |
| 7,030,863 B2 | 4/2006 | Longe et al. |
| 7,053,777 B2 | 5/2006 | Allen |
| 7,054,293 B2 | 5/2006 | Tiedemann et al. |
| 7,057,495 B2 | 6/2006 | Debord |
| RE39,226 E | 8/2006 | Lappe |
| 7,092,567 B2 | 8/2006 | Ma et al. |
| RE39,266 E | 9/2006 | Lohray et al. |
| 7,117,144 B2 | 10/2006 | Goodman et al. |
| 7,156,308 B2 * | 1/2007 | Lubow ................ G06K 7/1434 235/462.01 |
| 7,156,597 B2 | 1/2007 | Goldsmith et al. |
| 7,157,048 B2 | 1/2007 | Goldsmith et al. |
| 7,165,019 B1 | 1/2007 | Lee et al. |
| 7,166,345 B2 | 1/2007 | Myers |
| 7,182,259 B2 * | 2/2007 | Lubow ................ G06K 1/121 235/462.01 |
| 7,184,950 B2 | 2/2007 | Weise |
| 7,224,346 B2 | 5/2007 | Sheng |
| 7,262,792 B2 | 8/2007 | Shniberg |
| 7,277,088 B2 | 10/2007 | Robinson et al. |
| 7,295,965 B2 | 11/2007 | Haigh et al. |
| 7,295,968 B2 | 11/2007 | Bietrix et al. |
| 7,296,019 B1 | 11/2007 | Chandrasekar et al. |
| 7,340,388 B2 | 3/2008 | Soricut |
| 7,386,442 B2 | 6/2008 | Dehlinger et al. |
| 7,457,808 B2 | 11/2008 | Gaussier |
| 7,475,015 B2 | 1/2009 | Epstein et al. |
| 7,558,725 B2 | 7/2009 | Greenwald et al. |
| 7,562,811 B2 | 7/2009 | Nemet et al. |
| 7,584,093 B2 | 9/2009 | Potter et al. |
| 7,587,217 B1 | 9/2009 | Laakso et al. |
| 7,590,626 B2 | 9/2009 | Li et al. |
| 7,600,912 B2 * | 10/2009 | Leute ................ G01K 3/005 374/157 |
| 7,702,680 B2 | 4/2010 | Yih et al. |
| 7,747,427 B2 | 6/2010 | Lee et al. |
| 7,813,916 B2 | 10/2010 | Bean |
| 7,845,305 B2 * | 12/2010 | Linke ................ G01K 11/12 116/216 |
| 7,917,355 B2 | 3/2011 | Wu et al. |
| 8,005,664 B2 | 8/2011 | Hanumanthappa |
| 8,091,776 B2 | 1/2012 | Nemet |
| 8,196,821 B2 | 6/2012 | Nemet |
| 8,242,466 B2 | 8/2012 | Uber |
| 8,271,266 B2 | 9/2012 | Gallagher et al. |
| 8,321,786 B2 | 11/2012 | Lunati |
| 8,341,520 B2 | 12/2012 | Iakobashvili et al. |
| 8,365,070 B2 | 1/2013 | Song et al. |
| 8,473,278 B2 | 6/2013 | Futagi et al. |
| 8,500,014 B2 | 8/2013 | Nemet et al. |
| 8,528,808 B2 | 9/2013 | Nemet |
| 8,540,156 B2 | 9/2013 | Nemet |
| 8,579,193 B2 | 11/2013 | Nemet |
| 8,626,786 B2 | 1/2014 | Halcrow et al. |
| 8,757,503 B2 | 6/2014 | Conzelmann |
| 8,807,422 B2 | 8/2014 | Nemet |
| 8,950,664 B2 | 2/2015 | Nemet et al. |
| 8,960,534 B2 | 2/2015 | Nemet et al. |
| 8,967,467 B2 | 3/2015 | Nemet et al. |
| 9,122,963 B2 | 9/2015 | Nemet |
| 9,135,544 B2 | 9/2015 | Nemet et al. |
| 9,317,794 B2 | 4/2016 | Nemet et al. |
| 9,349,086 B2 | 5/2016 | Nemet et al. |
| 9,373,100 B2 | 6/2016 | Nemet et al. |
| 9,384,435 B2 | 7/2016 | Nemet et al. |
| 9,396,423 B2 | 7/2016 | Nemet et al. |
| 9,400,952 B2 | 7/2016 | Nemet |
| 9,558,439 B2 | 1/2017 | Nemet et al. |
| 9,626,610 B2 | 4/2017 | Nemet et al. |
| 9,633,296 B2 | 4/2017 | Nemet |
| 9,646,237 B2 | 5/2017 | Nemet et al. |
| 9,646,277 B2 | 5/2017 | Nemet et al. |
| 9,710,743 B2 | 7/2017 | Nemet et al. |
| 9,857,236 B2 * | 1/2018 | Ribi ................ C08F 238/02 |
| 10,049,314 B2 | 8/2018 | Nemet et al. |
| 10,089,566 B2 | 10/2018 | Nemet et al. |
| 10,318,781 B2 * | 6/2019 | Prusik ................ G06K 7/1473 |
| 10,534,989 B2 * | 1/2020 | Tokuda ................ G06K 7/1434 |
| 10,546,172 B2 * | 1/2020 | Prusik ................ G06K 7/1473 |
| 10,747,974 B2 * | 8/2020 | Ishida ................ G06K 19/06 |
| 2002/0012332 A1 | 1/2002 | Tiedemann et al. |
| 2002/0032564 A1 | 3/2002 | Eshani et al. |
| 2002/0056756 A1 | 5/2002 | Cameron et al. |
| 2002/0128821 A1 | 9/2002 | Ehsani |
| 2002/0169595 A1 | 11/2002 | Agichtein et al. |
| 2003/0136503 A1 | 7/2003 | Green et al. |
| 2003/0187632 A1 | 10/2003 | Menich |
| 2003/0204569 A1 | 10/2003 | Andrews et al. |
| 2003/0210249 A1 | 11/2003 | Simske |
| 2003/0227392 A1 | 12/2003 | Ebert |
| 2003/0233222 A1 | 12/2003 | Soricut et al. |
| 2004/0002849 A1 | 1/2004 | Zhou |
| 2004/0018641 A1 | 1/2004 | Goldsmith et al. |

(56) References Cited

U.S. PATENT DOCUMENTS

| | | |
|---|---|---|
| 2004/0030540 A1 | 2/2004 | Ovil et al. |
| 2004/0093567 A1 | 5/2004 | Schabes et al. |
| 2004/0104141 A1* | 6/2004 | Norrby .................. B65D 79/02 206/459.1 |
| 2004/0138869 A1 | 7/2004 | Heinecke |
| 2004/0215514 A1 | 10/2004 | Devlin |
| 2004/0260543 A1 | 12/2004 | Horowitz |
| 2005/0043940 A1 | 2/2005 | Elder |
| 2005/0044495 A1 | 2/2005 | Lee et al. |
| 2005/0053900 A1 | 3/2005 | Kaufmann |
| 2005/0083413 A1 | 4/2005 | Reed et al. |
| 2005/0091030 A1 | 4/2005 | Jessee et al. |
| 2005/0091088 A1 | 4/2005 | Peterson |
| 2005/0108001 A1 | 5/2005 | Aarskog |
| 2005/0120002 A1 | 6/2005 | Behbehani |
| 2005/0139686 A1* | 6/2005 | Helmer .................... G09F 3/00 235/494 |
| 2005/0143971 A1 | 6/2005 | Burstein |
| 2005/0162274 A1 | 7/2005 | Shniberg et al. |
| 2005/0188910 A1 | 9/2005 | McCorkle |
| 2005/0209844 A1 | 9/2005 | Wu et al. |
| 2005/0257146 A1 | 11/2005 | Ashcraft et al. |
| 2006/0003297 A1 | 1/2006 | Wiig et al. |
| 2006/0032427 A1* | 2/2006 | Ishii ..................... G09F 3/0294 116/217 |
| 2006/0048055 A1 | 3/2006 | Wu et al. |
| 2006/0057022 A1 | 3/2006 | Williams |
| 2006/0060657 A1 | 3/2006 | Choong et al. |
| 2006/0074655 A1 | 4/2006 | Bejar et al. |
| 2006/0081711 A1 | 4/2006 | Zhao et al. |
| 2006/0110714 A1 | 5/2006 | Symmes |
| 2006/0129381 A1 | 6/2006 | Wakita |
| 2006/0247914 A1 | 11/2006 | Brener et al. |
| 2006/0260958 A1 | 11/2006 | Brunner |
| 2007/0067177 A1 | 3/2007 | Martin |
| 2007/0094024 A1 | 4/2007 | Kristensson et al. |
| 2007/0106937 A1 | 5/2007 | Cucerzan et al. |
| 2007/0141544 A1 | 6/2007 | Nakane |
| 2007/0145142 A1* | 6/2007 | Lubow .................... G06K 19/06 235/462.01 |
| 2007/0238084 A1 | 10/2007 | Maguire et al. |
| 2007/0241916 A1 | 10/2007 | Hedtke |
| 2007/0265831 A1 | 11/2007 | Dinur et al. |
| 2007/0271089 A1 | 11/2007 | Bates et al. |
| 2008/0043804 A1* | 2/2008 | Goldsmith ............ G09F 3/0291 374/106 |
| 2008/0059151 A1 | 3/2008 | Chen |
| 2008/0077859 A1 | 3/2008 | Schabes et al. |
| 2008/0154600 A1 | 6/2008 | Tian et al. |
| 2008/0167858 A1 | 7/2008 | Christie et al. |
| 2008/0173712 A1 | 7/2008 | Nemet |
| 2008/0189106 A1 | 8/2008 | Low et al. |
| 2008/0195940 A1 | 8/2008 | Gail et al. |
| 2008/0208567 A1 | 8/2008 | Brockett et al. |
| 2008/0208582 A1 | 8/2008 | Gallino |
| 2008/0232427 A1* | 9/2008 | Leute ..................... G01K 11/06 374/161 |
| 2008/0249773 A1 | 10/2008 | Bejar et al. |
| 2008/0270897 A1 | 10/2008 | Jawerth et al. |
| 2009/0010304 A1* | 1/2009 | Skinner ................... G01K 3/04 374/102 |
| 2009/0083028 A1 | 3/2009 | Davtchev et al. |
| 2009/0198671 A1 | 8/2009 | Zhang |
| 2009/0228467 A1 | 9/2009 | Asanuma |
| 2009/0230182 A1 | 9/2009 | Nemet et al. |
| 2009/0302102 A1 | 12/2009 | Nemet et al. |
| 2009/0319257 A1 | 12/2009 | Blume et al. |
| 2009/0320742 A1 | 12/2009 | Leute et al. |
| 2010/0020970 A1 | 1/2010 | Liu |
| 2010/0050074 A1 | 2/2010 | Nachmani et al. |
| 2010/0219235 A1 | 9/2010 | Nemet et al. |
| 2010/0269454 A1 | 10/2010 | Reddersen et al. |
| 2010/0275118 A1 | 10/2010 | Iakobashvili et al. |
| 2010/0286979 A1 | 11/2010 | Zangvil et al. |
| 2011/0006109 A1 | 1/2011 | Nemet |
| 2011/0006115 A1 | 1/2011 | Nemet |
| 2011/0093268 A1 | 4/2011 | Gorin et al. |
| 2011/0184720 A1 | 7/2011 | Zangvil |
| 2012/0104105 A1 | 5/2012 | Nemet |
| 2012/0104106 A1 | 5/2012 | Nemet |
| 2012/0145781 A1 | 6/2012 | Nemet |
| 2012/0206242 A1* | 8/2012 | Cho .................... G06K 19/0717 340/10.42 |
| 2012/0305637 A1 | 12/2012 | Nemet |
| 2012/0326878 A1* | 12/2012 | Viguie .................... G01K 3/04 340/584 |
| 2013/0024185 A1 | 1/2013 | Parikh |
| 2013/0074248 A1 | 3/2013 | Evans et al. |
| 2013/0138641 A1 | 5/2013 | Korolev et al. |
| 2013/0152848 A1* | 6/2013 | Lucht ..................... C09D 11/50 116/201 |
| 2013/0215004 A1* | 8/2013 | Nordlinder ...... G06K 19/06037 345/105 |
| 2013/0334301 A1 | 12/2013 | Nemet et al. |
| 2014/0001256 A1 | 1/2014 | Nemet et al. |
| 2014/0110486 A1 | 4/2014 | Nemet |
| 2014/0210201 A1* | 7/2014 | Owen .................... G09F 3/0291 283/94 |
| 2014/0252096 A1 | 9/2014 | Nemet et al. |
| 2014/0353385 A1 | 12/2014 | Nemet |
| 2014/0360269 A1 | 12/2014 | Burghardt et al. |
| 2015/0047552 A1 | 2/2015 | Ortais |
| 2015/0053776 A1 | 2/2015 | Nemet et al. |
| 2015/0100105 A1 | 4/2015 | Kiani et al. |
| 2015/0122880 A1 | 5/2015 | Nemet et al. |
| 2015/0168223 A1 | 6/2015 | Hammond et al. |
| 2015/0193677 A1 | 7/2015 | Nemet et al. |
| 2015/0220877 A1 | 8/2015 | Nemet et al. |
| 2016/0042260 A1 | 2/2016 | Nemet |
| 2016/0071000 A1 | 3/2016 | Nemet et al. |
| 2016/0076947 A1* | 3/2016 | Ribi .................... C09B 67/0013 250/474.1 |
| 2016/0153843 A1* | 6/2016 | Edson .................... G01K 11/12 116/216 |
| 2016/0239781 A1 | 8/2016 | Nemet et al. |
| 2016/0275390 A1 | 9/2016 | Nemet et al. |
| 2016/0292554 A1 | 10/2016 | Nemet et al. |
| 2016/0371576 A1 | 12/2016 | Nemet et al. |
| 2016/0371577 A1 | 12/2016 | Nemet |
| 2016/0371635 A1 | 12/2016 | Nemet et al. |
| 2017/0177987 A1 | 6/2017 | Nemet et al. |
| 2017/0262782 A1 | 9/2017 | Nemet et al. |
| 2017/0270396 A1 | 9/2017 | Nemet |
| 2017/0277988 A1 | 9/2017 | Nemet et al. |
| 2017/0300791 A1 | 10/2017 | Nemet et al. |
| 2020/0234019 A1* | 7/2020 | Prusik ................ G06K 19/0614 |

FOREIGN PATENT DOCUMENTS

| | | |
|---|---|---|
| CN | 101292140 | 10/2008 |
| CN | 201159676 | 12/2008 |
| CN | 101365934 | 2/2009 |
| CN | 102257371 | 11/2011 |
| CN | 204176727 | 2/2015 |
| EP | 936753 | 8/1999 |
| JP | S57-59293 | 4/1982 |
| JP | 63094383 | 4/1988 |
| JP | 63-118894 | 5/1988 |
| JP | 3-53281 | 3/1991 |
| JP | 5-6470 | 1/1993 |
| JP | 5-19695 | 1/1993 |
| JP | 5-67253 | 3/1993 |
| JP | 9-504858 | 11/1994 |
| JP | 2006-522933 | 5/1997 |
| JP | H11-248552 | 9/1999 |
| JP | 2001-502794 | 2/2001 |
| JP | 2001-194248 | 7/2001 |
| JP | 2001/064430 | 9/2001 |
| JP | 2002-040012 | 2/2002 |
| JP | 2002/504684 | 2/2002 |
| JP | 2003-203210 | 7/2003 |
| JP | 2003/525464 | 8/2003 |

(56) References Cited

FOREIGN PATENT DOCUMENTS

| | | |
|---|---|---|
| JP | 2005-518320 | 6/2005 |
| JP | 2006-18782 | 1/2006 |
| JP | 2007121017 | 5/2007 |
| JP | 2004-184920 | 7/2007 |
| JP | 2008/089673 | 4/2008 |
| JP | 2008-233909 | 10/2008 |
| JP | 2009-512597 | 3/2009 |
| WO | 1994/27144 | 11/1994 |
| WO | 1994/27155 | 11/1994 |
| WO | 1997/011535 | 3/1997 |
| WO | 1998/14777 | 4/1998 |
| WO | 1998/035514 | 12/1998 |
| WO | 1999/042822 | 8/1999 |
| WO | 2001/048680 | 7/2001 |
| WO | 2003/060626 | 7/2003 |
| WO | 2004/038353 | 5/2004 |
| WO | 2004/038535 | 5/2004 |
| WO | 2004/092697 | 10/2004 |
| WO | 2006-086053 | 8/2006 |
| WO | 2007-049792 | 5/2007 |
| WO | WO 2004/050506 | 6/2007 |
| WO | 2008/022140 | 2/2008 |
| WO | 09/016631 | 2/2009 |
| WO | 2007/129316 | 4/2009 |
| WO | 2008/135962 | 4/2009 |
| WO | 2009/063464 | 5/2009 |
| WO | 2009/063465 | 5/2009 |
| WO | 2009-144701 | 12/2009 |
| WO | 2009/150641 | 12/2009 |
| WO | 10/013228 | 2/2010 |
| WO | 2010/134061 | 11/2010 |
| WO | 2010/134062 | 11/2010 |
| WO | 2016/185474 | 11/2016 |
| WO | 2006/134795 | 12/2016 |
| WO | 2017/006326 | 1/2017 |

OTHER PUBLICATIONS

An Office Action dated Nov. 4, 2013, which issued during the prosecution of U.S. Appl. No. 13/323,906.
An Office Action dated Oct. 11, 2016, which issued during the prosecution of U.S. Appl. No. 15/184,483.
A Notice of Allowance dated Nov. 18, 2014, which issued during the prosecution of U.S. Appl. No. 13/323,906.
A Notice of Allowance dated Apr. 23, 2014, which issued during the prosecution of U.S. Appl. No. 13/323,906.
An Office Action dated May 5, 2016, which issued during the prosecution of Canadian Patent Application No. 2,762,894.
A Notice of Allowance dated Apr. 25, 2014, which issued during the prosecution of U.S. Appl. No. 13/490,705.
A Notice of Allowance dated Nov. 7, 2014, which issued during the prosecution of U.S. Appl. No. 13/490,705.
An English translation of an Office Action dated Feb. 3, 2014 which issued during the prosecution of Japanese Patent Application No. 2012-511407.
An English translation of an Office Action dated Aug. 26, 2014 which issued during the prosecution of Japanese Patent Application No. 2012-511407.
An Office Action dated Mar. 6, 2015, which issued during the prosecution of U.S. Appl. No. 14/055,422.
An English translation of an Office Action dated Jun. 25, 2013 which issued during the prosecution of Japanese Patent Application No. 2012-511406.
An Office Action dated Nov. 7, 2012, which issued during the prosecution of U.S. Appl. No. 12/743,209.
An English Translation of an Office Action dated Dec. 24, 2013 which issued during the prosecution of Chinese Patent Application No. 200980160387.4.
An Office Action dated Mar. 9, 2012, which issued during the prosecution of U.S. Appl. No. 12/743,209.

Notice of Allowance dated Apr. 14, 2014, which issued during the prosecution of U.S. Appl. No. 13/657,185.
An Office Action dated Jan. 16, 2013, which issued during the prosecution of U.S. Appl. No. 12/598,979.
An Office Action dated Dec. 19, 2012, which issued during the prosecution of U.S. Appl. No. 12/742,650.
An Office Action dated Mar. 20, 2012, which issued during the prosecution of U.S. Appl. No. 13/321,477.
An Office Action dated Aug. 14, 2015, which issued during the prosecution of U.S. Appl. No. 14/055,422.
An English Translation of an Office Action dated Feb. 26, 2013 which issued during the prosecution of Japanese Patent Application No. JP2009-508663.
An English Translation of an Office Action dated Jan. 15, 2013 which issued during the prosecution of Japanese Patent Application No. JP2010-507054.
An Extended European Search Report dated Feb. 11, 2013, which issued during the prosecution of European Patent Application No. 08848845.
An Extended European Search Report dated Feb. 18, 2013, which issued during the prosecution of European Application No. 09762166.
An Office Action dated Nov. 7, 2011, which issued during the prosecution of U.S. Appl. No. 12/598,979.
An International Preliminary Report on Patentability dated Nov. 22, 2011 which issued during the prosecution of Applicant's PCT/IL10/00205.
U.S. Appl. No. 60/746,646, filed May 7, 2006.
U.S. Appl. No. 60/804,072, filed Jun. 6, 2006.
U.S. Appl. No. 61/231,799, filed Aug. 6, 2009.
U.S. Appl. No. 61/131,644, filed Jun. 10, 2008.
An Office Action dated Oct. 28, 2013, which issued during the prosecution of U.S. Appl. No. 14/017,545.
An Office Action dated Jun. 20, 2008, which issued during the prosecution of U.S. Appl. No. 11/852,911.
An International Search Report and a Written Opinion both dated Jul. 17, 2008, which issued during the prosecution of Applicant's PCTIL2007000547.
An International Preliminary Report on Patentability dated Mar. 10, 2009, which issued during the prosecution of Applicant's PCTIL2007000547.
An International Search Report and a Written Opinion both dated Jan. 9, 2009, which issued during the prosecution of Applicant's PCT/IL2007/001411.
An International Preliminary Report on Patentability dated Nov. 10, 2009, which issued during the prosecution of Applicant's PCT/IL2007/001411.
A Notice of Allowance dated Feb. 15, 2012, which issued during the prosecution of U.S. Appl. No. 12/471,798.
European Search Report dated Aug. 18, 2011, which issued during the prosecution of European Patent Application No. 0 773 6287.
An Office Action dated Apr. 19, 2011, which issued during the prosecution of U.S. Appl. No. 12/469,309.
A Notice of Allowance dated Sep. 9, 2011, which issued during the prosecution of U.S. Appl. No. 12/469,309.
An Office Action dated May 3, 2011, which issued during the prosecution of U.S. Appl. No. 12/471,798.
An International Search Report and a Written Opinion both dated Aug. 31, 2009, which issued during the prosecution of Applicant's PCT/IL2009/000503.
An International Preliminary Report on Patentability dated Dec. 13, 2010, which issued during the prosecution of Applicant's PCT/IL2009/000503.
An International Search Report and a Written Opinion both dated Apr. 5, 2010, which issued during the prosecution of Applicant's PCT/IL2009/001167.
An International Preliminary Report on Patentability dated Nov. 22, 2011, which issued during the prosecution of Applicant's PCT/IL2009/001167.
A Notice of Allowance dated Apr. 2, 2013, which issued during the prosecution of U.S. Appl. No. 12/743,209.
An English Translation of an Office Action dated May 22, 2015 which issued during the prosecution of Chinese Patent Application No. 200980160387.4.

(56) References Cited

OTHER PUBLICATIONS

An Office Action dated Sep. 10, 2013, which issued during the prosecution of U.S. Appl. No. 13/657,185.
An English translation of an Office Action dated Sep. 10, 2013 which issued during the prosecution of Japanese Patent Application No. 2011-513110.
An English translation of an Office Action dated Aug. 27, 2013 which issued during the prosecution of Japanese Patent Application No. 2010-507054.
An Examiner Interview Summary Report dated Nov. 7, 2008, which issued during the prosecution of U.S. Appl. No. 11/852,911.
A Notice of Allowance dated Feb. 25, 2009, which issued during the prosecution of U.S. Appl. No. 11/852,911.
An Office Action dated Mar. 15, 2013, which issued during the prosecution of U.S. Appl. No. 13/321,467.
A Notice of Allowance dated Jul. 11, 2013, which issued during the prosecution of U.S. Appl. No. 13/321,477.
An Office Action dated Jul. 12, 2013, which issued during the prosecution of European Patent Application No. 07736287.9.
A Notice of Allowance dated May 16, 2013, which issued during the prosecution of U.S. Appl. No. 12/742,650.
An Office Action dated Sep. 18, 2014, which issued during the prosecution of U.S. Appl. No. 14/143,827.
A Notice of Allowance dated Oct. 15, 2014, which issued during the prosecution of U.S. Appl. No. 14/017,545.
A Notice of Allowance dated Apr. 17, 2009, which issued during the prosecution of U.S. Appl. No. 11/852,911.
An Office Action dated Sep. 9, 2011, which issued during the prosecution of U.S. Appl. No. 12/471,798.
An Office Action dated Oct. 12, 2012, which issued during the prosecution of U.S. Appl. No. 12/669,175.
An Office Action dated Aug. 5, 2013, which issued during the prosecution of U.S. Appl. No. 12/669,175.
An Office Action dated Feb. 5, 2013, which issued during the prosecution of U.S. Appl. No. 12/669,175.
An Office Action dated Mar. 7, 2014, which issued during the prosecution of U.S. Appl. No. 12/669,175.
A Notice of Allowance dated Aug. 4, 2014, which issued during the prosecution of U.S. Appl. No. 12/669,175.
An English Translation of an Office Action dated Apr. 22, 2014 which issued during the prosecution of Israeli Patent Application No. 205687.
An English Translation of an Office Action dated Oct. 27, 2014 which issued during the prosecution of Israeli Patent Application No. 209901.
A Notice of Allowance dated Dec. 14, 2016, which issued during the prosecution of U.S. Appl. No. 15/189,127.
An Office Action dated Jul. 1, 2014, which issued during the prosecution of U.S. Appl. No. 13/576,330.
An International Search Report and a Written Opinion both dated Oct. 3, 2016, which issued during the prosecution of Applicant's PCT/IL2016/050526.
An English Translation of an Office Action dated Jun. 13, 2014 which issued during the prosecution of Chinese Patent Application No. 200880101405.7.
An Office Action dated Nov. 23, 2016, which issued during the prosecution of U.S. Appl. No. 15/063,804.
Letter submitted on Jul. 17, 2009 in U.S. Appl. No. 11/852,911.
A Notice of Allowance dated Oct. 26 2016, which issued during the prosecution of U.S. Appl. No. 15/189,127.
An Office Action dated May 9, 2013, which issued during the prosecution of U.S. Appl. No. 12/937,618.
An English Translation of an Office Action dated Jan. 25, 2013 which issued during the prosecution of Chinese Patent Application No. 200880101405.7.
Notice of Allowance dated Jan. 5, 2017, which issued during the prosecution of U.S. Appl. No. 15/183,465.
An English Translation of an Office Action dated Apr. 28, 2012 which issued during the prosecution of Chinese Patent Application No. 200880101405.7.
Notice of Allowance dated May 13, 2015, which issued during the prosecution of U.S. Appl. No. 14/461,778.
A Notice of Allowance dated Jun. 27, 2014, which issued during the prosecution of U.S. Appl. No. 14/017,545.
A Supplementary European Search Report dated Jul. 5, 2012, which issued during the prosecution of European Patent Application No. 08789727.
An English Translation of an Office Action dated Jun. 23, 2011 which issued during the prosecution of Chinese Patent Application No. 200880101405.7.
An International Search Report and a Written Opinion both dated May 25, 2011, which issued during the prosecution of Applicant's PCT/IL2011/00088.
An International Search Report dated May 11, 2009, which issued during the prosecution of Applicant's PCT/IL2009/00130.
An International Search Report dated Jun. 26, 2009, which issued during the prosecution of Applicant's PCT/IL2009/00317.
An International Preliminary Examination Report dated Oct. 19, 2010, which issued during the prosecution of Applicant's PCT/IL2009/00317.
Bick, E., "A Constraint Grammar Based Spellchecker for Danish with a Special Focus on Dyslexics" SKY Journal of Linguistics, vol. 19:2006 (ISSN 1796-279X), pp. 387-396 (retrieved Jan. 12, 2009 from the internet). <URL http://www.ling.helsinki.fi/sky/julkaisut/SKY2006_1/1.6.1.%20BICK.pdf>.
An International Search Report and Written Opinion both dated Feb. 3, 2009 which issued during the prosecution of Applicant's PCT/IL08/01051.
An Office Action dated Jan. 10, 2014, which issued during the prosecution of European Patent Application No. 08848845.
An Office Action dated Jun. 5, 2014, which issued during the prosecution of U.S. Appl. No. 14/017,545.
A Notice of Allowance dated Apr. 26, 2013, which issued during the prosecution of U.S. Appl. No. 12/598,979.
A Supplementary European Search Report dated Apr. 13, 2011, which issued during the prosecution of European Patent Application No. 07827384.
An English Translation of an Office Action dated Feb. 7, 2012 which issued during the prosecution of Japanese Patent Application No. JP2009-508663.
A Supplementary European Search Report dated Aug. 23, 2012, which issued during the prosecution of European Patent Application No. 08849330.9.
An International Preliminary Report on Patentability dated May 18, 2010, which issued during the prosecution of Applicant's PCT/IL2008/001495.
An International Preliminary Report on Patentability dated May 18, 2010, which issued during the prosecution of Applicant's PCT/IL2008/001494.
An International Search Report and a Written Opinion both dated Jun. 3, 2009, which issued during the prosecution of Applicant's PCT/IL2008/001494.
An International Search Report and a Written Opinion both dated Jun. 8, 2010, which issued during the prosecution of Applicant's PCT/IL2010/000205.
An International Search Report and a Written Opinion both dated Mar. 9, 2009, which issued during the prosecution of Applicant's PCT/IL2008/001495.
An Office Action dated Apr. 25, 2012, which issued during the prosecution of U.S. Appl. No. 12/598,979.
An English Translation of an Office Action dated Oct. 25, 2012 which issued during the prosecution of Israeli Patent Application No. 201958.
An Office Action dated Jan. 21, 2015, which issued during the prosecution of U.S. Appl. No. 14/461,778.
An Office Action dated Feb. 11, 2015, which issued during the prosecution of U.S. Appl. No. 13/958,893.
An English Translation of an Office Action dated Feb. 18, 2014 which issued during the prosecution of Japanese Patent Application No. JP2009-508663.
U.S. Appl. No. 60/963,956, filed Aug. 6, 2007.
U.S. Appl. No. 60/959,120, filed Jul. 10, 2007.

(56) References Cited

OTHER PUBLICATIONS

An Office Action dated Sep. 25, 2014, which issued during the prosecution of U.S. Appl. No. 14/461,778.
An English Translation of an Office Action dated Nov. 4, 2014 which issued during the prosecution of Chinese Patent Application No. 201080030956.6.
An English Translation of an Office Action dated Apr. 19, 2015 which issued during the prosecution of Israeli Patent Application No. 216396.
An English Translation of an Office Action dated Nov. 15, 2014 which issued during the prosecution of Chinese Patent Application No. 200980160387.4.
An English Translation of an Office Action dated Jan. 6, 2014 which issued during the prosecution of Chinese Patent Application No. 201080030956.6.
An English translation of an Office Action dated Jul. 28, 2015 which issued during the prosecution of Japanese Patent Application No. 2014-125707.
Notice of Allowance dated May 29, 2015, which issued during the prosecution of U.S. Appl. No. 13/958,893.
An Office Action dated Jul. 28, 2015, which issued during the prosecution of U.S. Appl. No. 14/595,412.
U.S. Appl. No. 62/163,193, filed May 18, 2015.
U.S. Appl. No. 62/189,367, filed Jul. 7, 2015.
An English translation of an Office Action dated Aug. 27, 2015 which issued during the prosecution of Japanese Patent Application No. 2014-218223.
An English Translation of an Office Action dated Dec. 31, 2015 which issued during the prosecution of Israeli Patent Application No. 209901.
An English Translation of an Office Action dated Apr. 20, 2015 which issued during the prosecution of Israeli Patent Application No. 216397.
A Supplementary European Search Report dated Sep. 23, 2015, which issued during the prosecution of European Patent Application No. 10777451.5.
European Search Report dated Sep. 16, 2015, which issued during the prosecution of European Patent Application No. 09844849.
A Notice of Allowance dated Dec. 8, 2015, which issued during the prosecution of U.S. Appl. No. 14/055,422.
A Notice of Allowance dated Jan. 18, 2017, which issued during the prosecution of U.S. Appl. No. 15/137,316.
An Office Action dated Nov. 19, 2013, which issued during the prosecution of European Application No. 07827384.4.
A Notice of Allowance dated Mar. 23, 2016, which issued during the prosecution of U.S. Appl. No. 14/823,758.
A Notice of Allowance dated Feb. 4, 2016, which issued during the prosecution of U.S. Appl. No. 14/595,395.
An Office Action dated Dec. 4, 2015, which issued during the prosecution of U.S. Appl. No. 14/823,758.
A Notice of Allowance dated Feb. 2, 2016, which issued during the prosecution of U.S. Appl. No. 14/595,412.
A Notice of Allowance dated Mar. 16, 2016, which issued during the prosecution of U.S. Appl. No. 14/595,954.
A Notice of Allowance dated Mar. 3, 2016, which issued during the prosecution of U.S. Appl. No. 14/528,186.
A Notice of Allowance dated Oct. 11, 2016, which issued during the prosecution of U.S. Appl. No. 14/823,702.
An English translation of an Office Action dated Jun. 14, 2016 which issued during the prosecution of Japanese Patent Application No. 2014-125707.
An English translation of an Office Action dated Mar. 15, 2016, which issued during the prosecution of Japanese Patent Application No. 2014-218223.
An Office Action dated Jan. 29, 2016, which issued during the prosecution of U.S. Appl. No. 14/595,954.
An Office Action dated Sep. 27, 2016, which issued during the prosecution of U.S. Appl. No. 15/189,127.
An Office Action dated Jun. 27, 2016, which issued during the prosecution of U.S. Appl. No. 14/823,702.
An Office Action dated Jan. 29, 2016, which issued during the prosecution of U.S. Appl. No. 14/528,186.
An Office Action dated Jan. 26, 2016, which issued during the prosecution of Canadian Patent Application No. 2762891.
An International Search Report and a Written Opinion both dated Dec. 12, 2016, which issued during the prosecution of Applicant's PCT/IL2016/050727.
An Office Action dated Jan. 24, 2017, which issued during the prosecution of Canadian Patent Application No. 2,762,894.
An Office Action dated Dec. 13, 2016, which issued during the prosecution of U.S. Appl. No. 15/169,851.
An Office Action dated Jun. 29, 2017, which issued during the prosecution of U.S. Appl. No. 15/398,951.
An English translation of an Office Action dated Nov. 2, 2016, which issued during the prosecution of Japanese Patent Application No. 2014-125707.
Notice of Allowance dated Mar. 23, 2017, which issued during the prosecution of U.S. Appl. No. 15/169,851.
Notice of Allowance dated Mar. 20, 2017, which issued during the prosecution of U.S. Appl. No. 15/063,804.
Notice of Allowance dated Aug. 3, 2017, which issued during the prosecution of U.S. Appl. No. 15/398,951.
An Office Action dated Jun. 28, 2017, which issued during the prosecution of U.S. Appl. No. 15/495,022.
An Office Action dated Jul. 27, 2017, which issued during the prosecution of U.S. Appl. No. 15/184,483.
An Office Action dated Jul. 26, 2017, which issued during the prosecution of U.S. Appl. No. 15/486,906.
An Office Action together with the English translation dated Sep. 5, 2017, which issued during the prosecution of Japanese Patent Application No. 2016-200656.
An Office Action dated Sep. 26, 2017, which issued during the prosecution of U.S. Appl. No. 15/488,943.
An English translation of an Office Action dated Dec. 7, 2017 which issued during the prosecution of Japanese Patent Application No. 2014-125707.
An Office Action dated Jan. 2, 2018, which issued during the prosecution of U.S. Appl. No. 15/184,483.
Notice of Allowance dated Jan. 9, 2019, which issued during the prosecution of U.S. Appl. No. 15/978,759.
An Office Action dated Feb. 26, 2019, which issued during the prosecution of U.S. Appl. No. 16/026,585.
An Office Action dated Dec. 11, 2018, which issued during the prosecution of U.S. Appl. No. 16/036,401.
European Search Report dated Feb. 11, 2019 which issued during the prosecution of Applicant's European App No. 16820959.1.
European Search Report dated Dec. 20, 2018, which issued during the prosecution of Applicant's European App No. 16796019.4.
JP Office Action in Japanese Appln. No. 2018-512508, dated Oct. 29, 2019, 3 pages (English translation).

\* cited by examiner

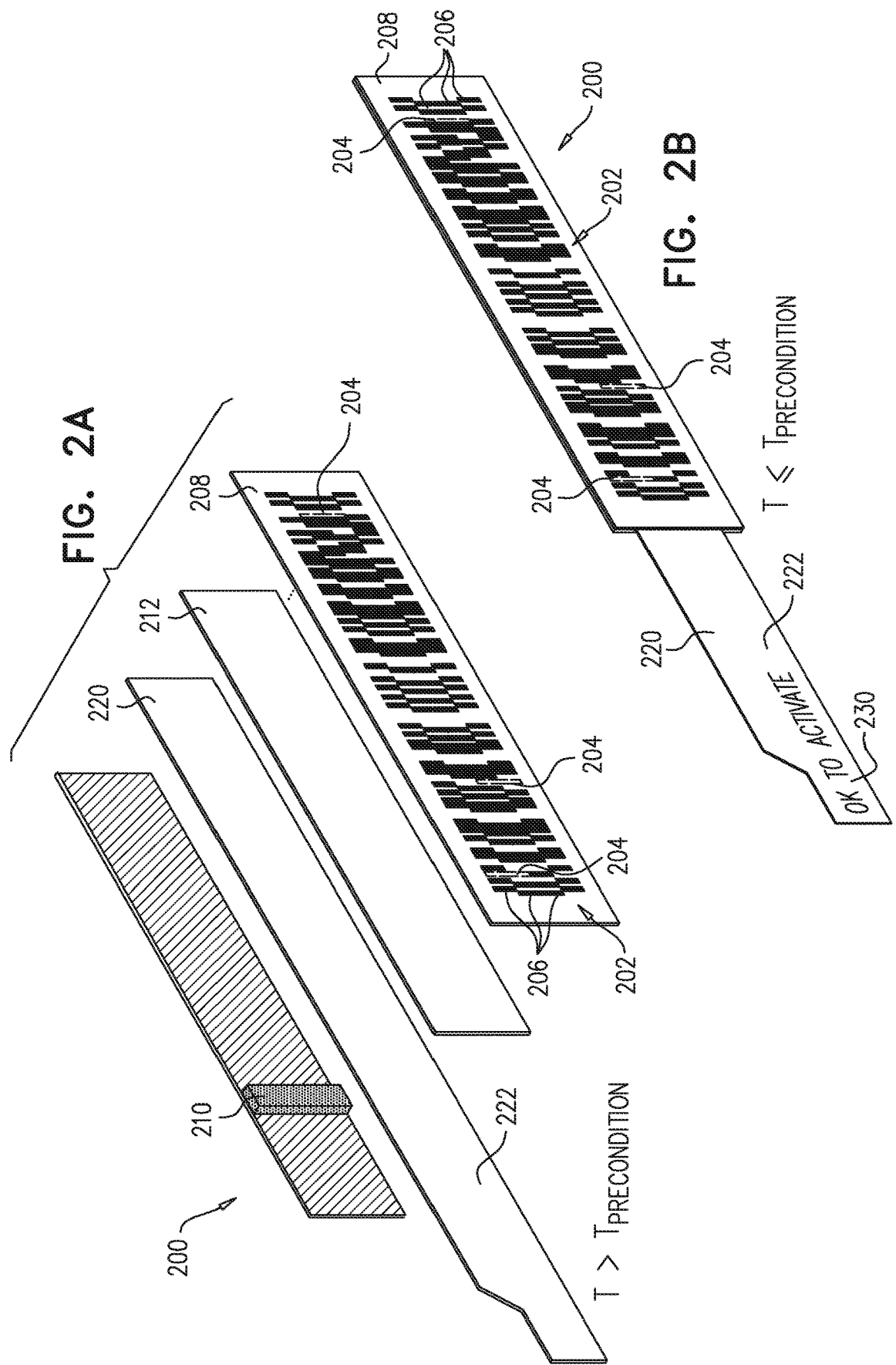

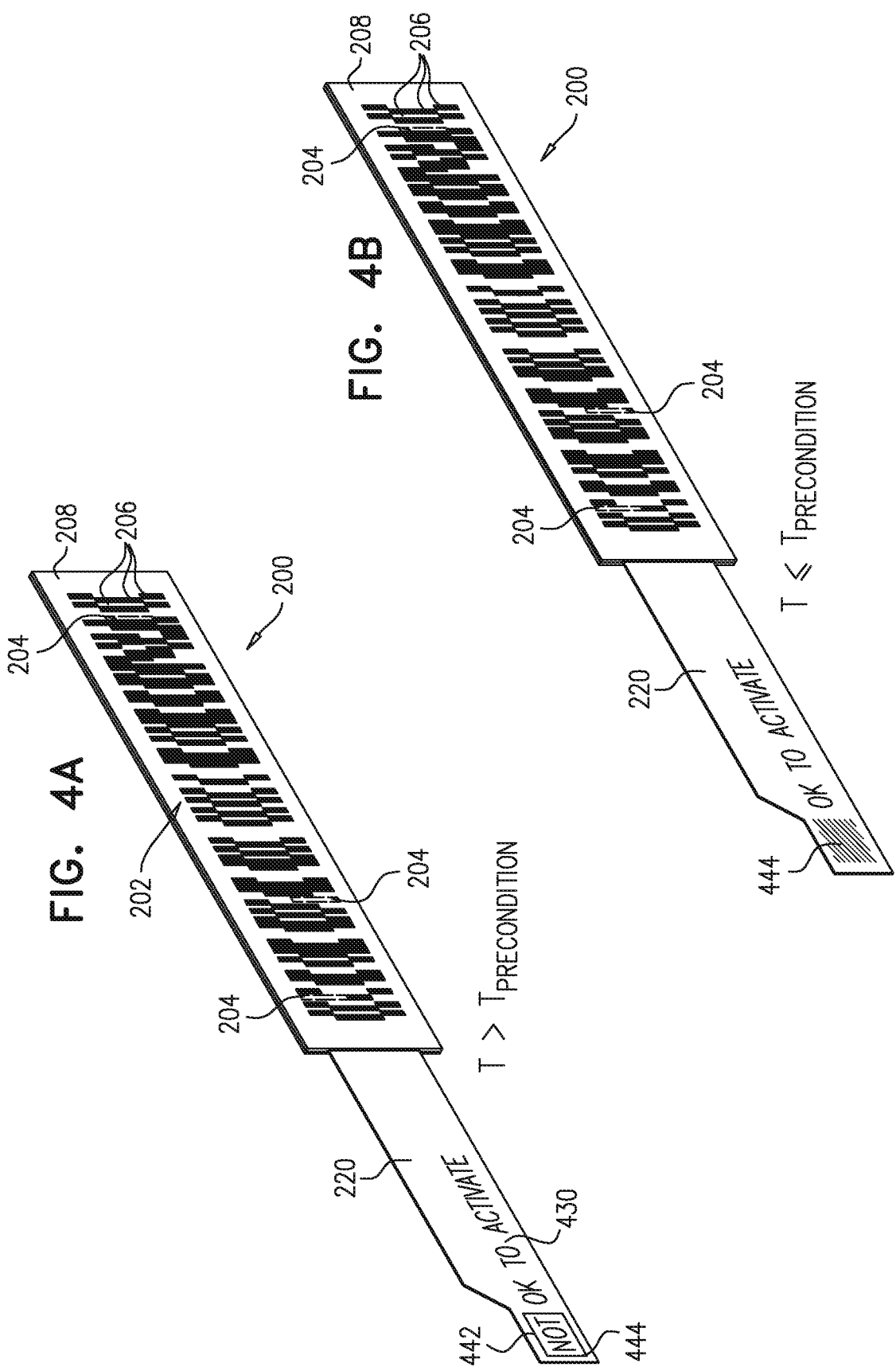

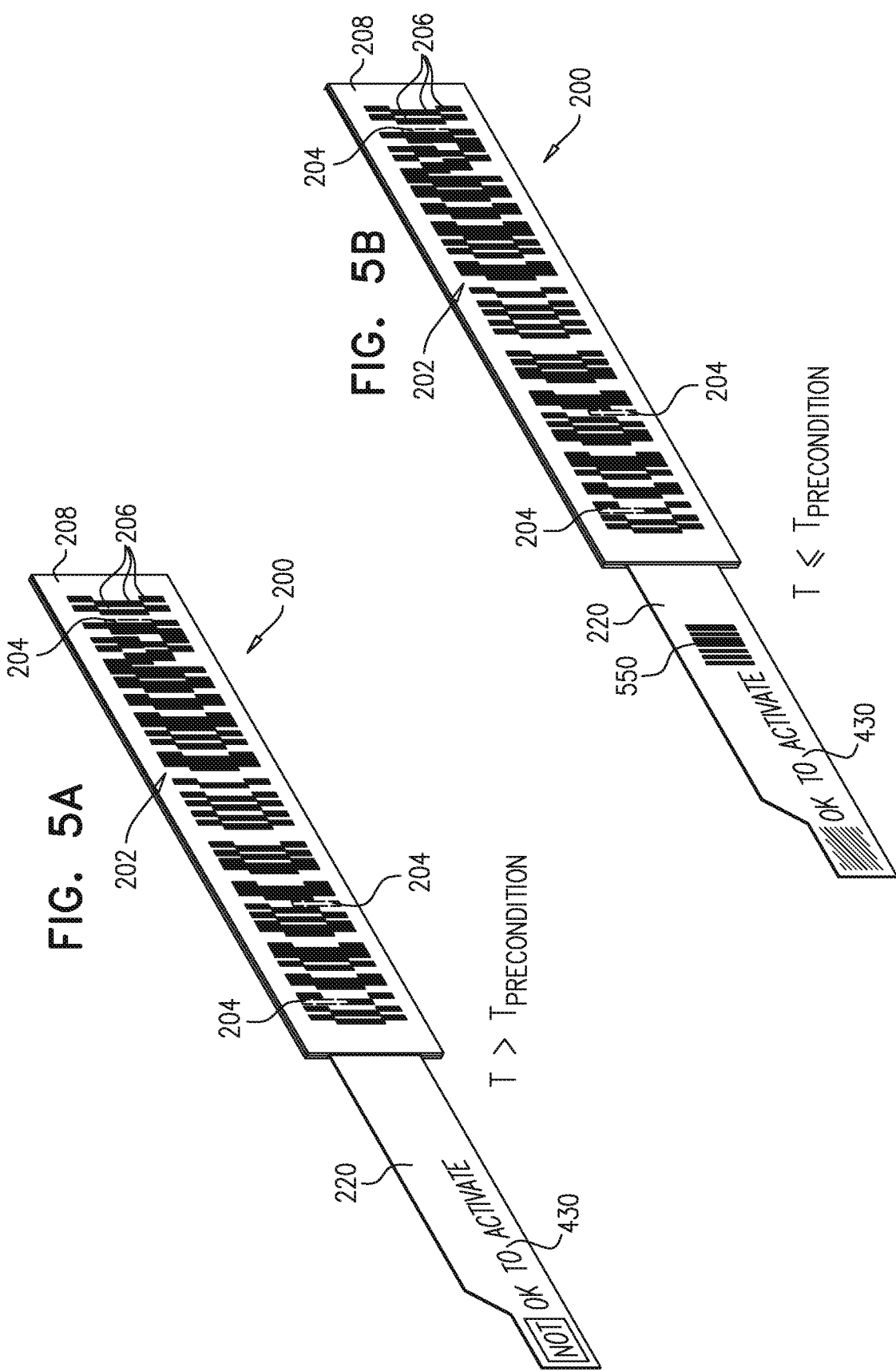

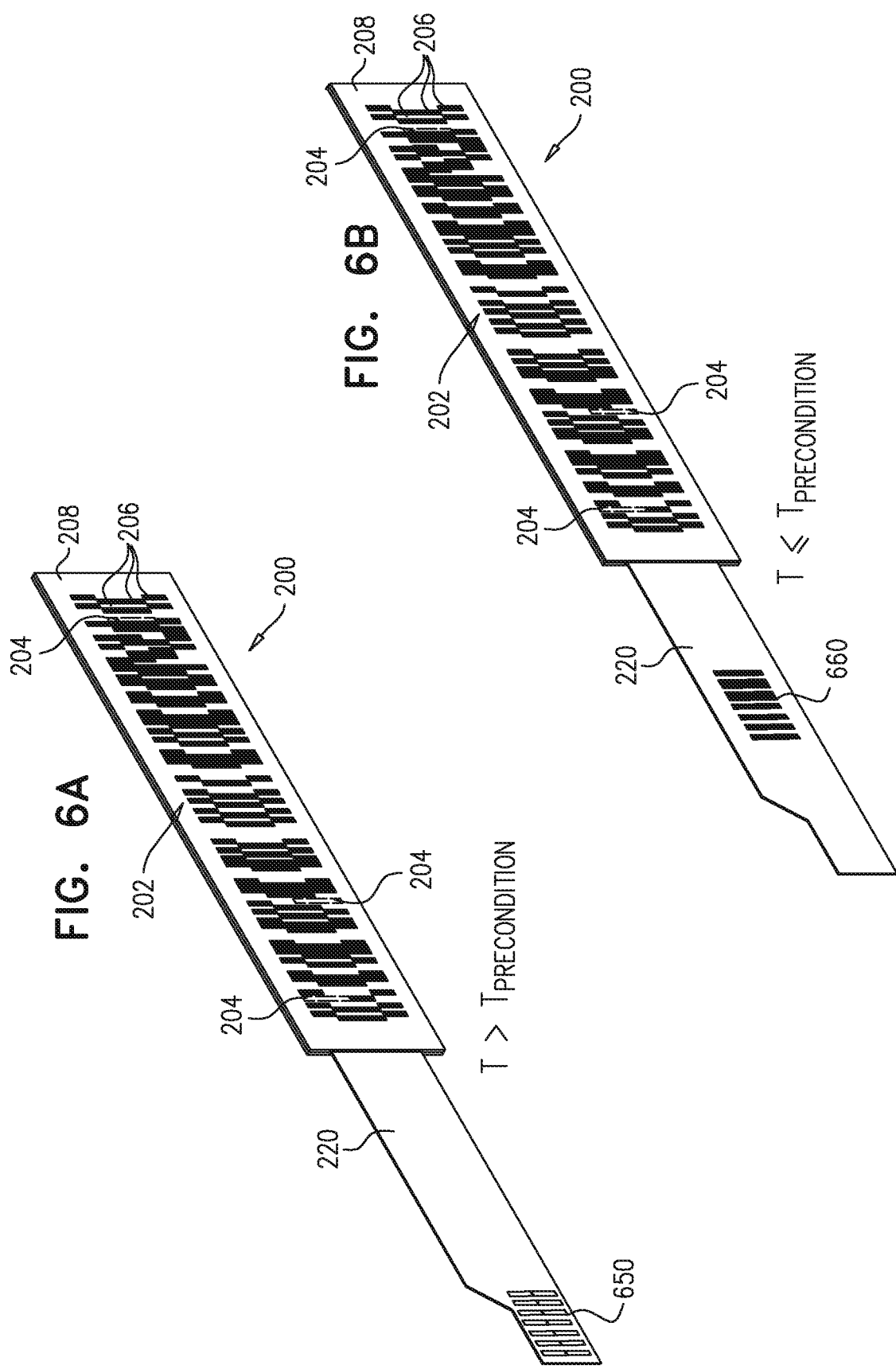

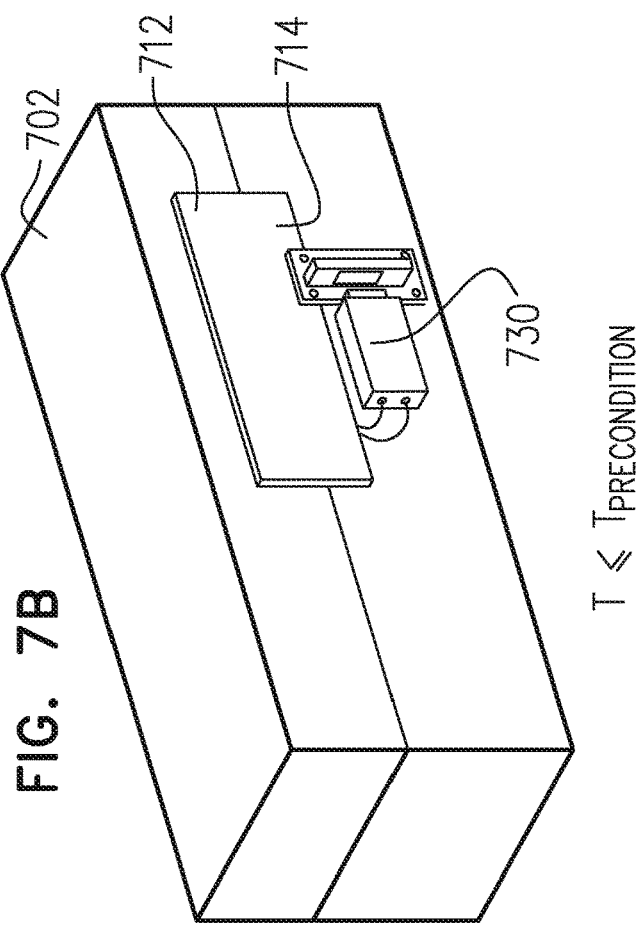
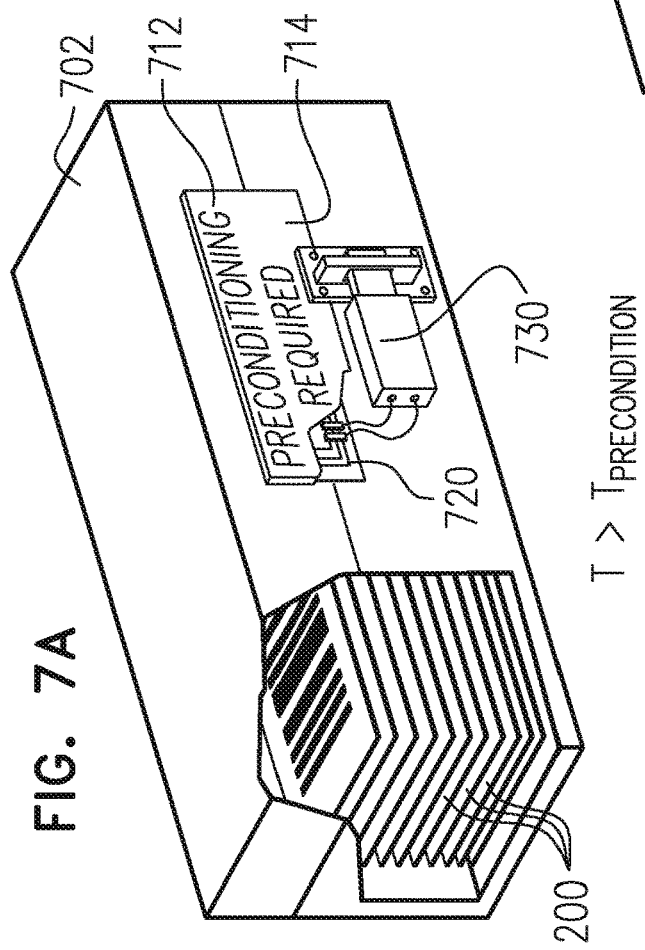

US 11,060,924 B2

THERMOCHROMIC INK INDICIA FOR ACTIVATABLE QUALITY LABELS

REFERENCE TO RELATED APPLICATIONS

Reference is hereby made to U.S. Provisional Patent Application 62/163,193, entitled THERMOCHROMIC INK INDICIA FOR QUALITY INDICATORS, filed May 18, 2015, the disclosure of which is hereby incorporated by reference and priority of which is hereby claimed pursuant to 37 CFR 1.78(a)(4) and (5)(i).

Reference is also made to the following US Patents and Patent Applications, owned by the assignee, the disclosures of which are hereby incorporated by reference:

U.S. Pat. Nos. 7,562,811; 8,091,776; 8,807,422; 8,579,193; 8,540,156; 8,528,808; 8,196,821; 8,950,664; 8,500,014; and U.S. Published Patent Application Nos. 2011/0006109; 2014/0353385; 2014/0252096; 2015/0053776; 2012/0145781; 2013/0334301; and 2012/0104105.

FIELD OF THE INVENTION

The present invention relates generally to quality labels and more particularly to activatable quality labels.

BACKGROUND OF THE INVENTION

Various types of activatable quality labels are known in the art.

SUMMARY OF THE INVENTION

The present invention seeks to provide an improved activatable quality label including thermochromic ink indicia.

There is thus provided in accordance with a preferred embodiment of the present invention an activatable quality label operative to provide an indication of exceedance of a temperature threshold following activation thereof at a temperature less than or equal to an activation temperature, including a readable indicator located on the quality label and operative, following activation of the quality label at or below the activation temperature, to readably indicate exceedance of the temperature threshold, an actuator element operative to activate the quality label and indicia at least partially formed by thermochromic ink, the thermochromic ink having a first visual appearance at temperatures less than or equal to the activation temperature and a second visual appearance at temperatures above the activation temperature, such that a visual appearance of the indicia is indicative of whether the quality label is at a temperature less than or equal to the activation temperature and hence may be activated.

In accordance with a preferred embodiment of the present invention, the activatable quality label is applied to an item sensitive to exceedance of the temperature threshold, the readable indicator readably indicating exceedance of the temperature threshold by the item.

Preferably, the readable indicator includes a colorable readable indicator.

Preferably, the readable indicator includes a human-readable indicator.

Additionally or alternatively, the readable indicator includes a machine-readable indicator.

Preferably, the readable indicator includes a barcoded indicator.

Preferably, the barcoded indicator includes a multiplicity of barcodes.

Preferably, the multiplicity of barcodes includes a first barcode including at least one first colorable area, the first barcode being machine-readable before exceedance of the temperature threshold and at least a second barcode including at least one second colorable area, the second barcode not being machine-readable before exceedance of the temperature threshold.

Preferably, the barcoded indicator also includes a coloring agent located at a first location on the quality label and a coloring agent pathway located adjacent to the first location, the coloring agent pathway being operative, following the activation of the quality label, to allow the coloring agent to move, at a rate which is at least partially a function of time, from the first location to the first and second colorable areas simultaneously for simultaneous coloring thereof upon exceedance of the temperature threshold, thereby causing the first barcode to become unreadable and at the same or close to the same time causing the second barcode to become machine-readable.

Preferably, the actuator element includes a displaceable pull strip.

Preferably, the first visual appearance includes the thermochromic ink being of a first color and the second visual appearance includes the thermochromic ink being of a second color, different to the first color.

Preferably, the first visual appearance is visible and the second visual appearance is at least partially invisible.

Alternatively, the first visual appearance is at least partially invisible and the second visual appearance is visible.

Preferably, the visual appearance of the thermochromic ink reversibly changes between the first visual appearance at temperatures less than or equal to the activation temperature and the second visual appearance at temperatures above the activation temperature.

In accordance with a preferred embodiment of the present invention, the thermochromic ink changes from the first visual appearance to the second visual appearance at a temperature generally equal to the activation temperature.

Alternatively, the thermochromic ink changes from the first visual appearance to the second visual appearance at a temperature below the activation temperature.

Preferably, the indicia include human-readable indicia. Additionally or alternatively, the indicia include machine-readable indicia.

Preferably, the indicia include at least one barcode.

Preferably, the at least one barcode includes a first barcode being machine-readable at temperatures less than or equal to the activation temperature and unreadable at temperatures greater than the activation temperature and a second barcode being unreadable at temperatures less than or equal to the activation temperature and machine-readable at temperatures greater than the activation temperature.

Preferably, the indicia is directly located on the quality label.

Alternatively, the indicia is not directly located on the quality label.

There is additionally provided in accordance with another preferred embodiment of the present invention a method for providing an indication of exceedance of a temperature threshold by an item, including providing an activatable quality label having a readable indicator formed at a first location thereon and thermochromic ink indicia formed at a second location with respect thereto, the readable indicator readably indicating exceedance of the temperature threshold following activation of the quality label at a temperature less than or equal to an activation temperature, the thermochromic ink indicia having a first visual appearance at temperatures less than or equal to the activation temperature and a second visual appearance at temperatures above the activation temperature, such that a visual appearance of the thermochromic ink indicia is indicative of whether the quality label is at a temperature less than or equal to the activation temperature, upon the thermochromic ink indicia indicating the quality label to be at a temperature less than or equal to the activation temperature, activating the quality label, and applying the activatable quality label to the item.

Preferably, the readable indicator includes a colorable readable indicator.

Preferably, the readable indicator includes a human-readable indicator.

Additionally or alternatively, the readable indicator includes a machine-readable indicator.

Preferably, the readable indicator includes a barcoded indicator.

Preferably, the barcoded indicator includes a multiplicity of barcodes.

Preferably, the multiplicity of barcodes includes a first barcode including at least one first colorable area, the first barcode being machine-readable before exceedance of the temperature threshold and at least a second barcode including at least one second colorable area, the second barcode not being machine-readable before exceedance of the temperature threshold.

Preferably, the barcoded indicator also includes a coloring agent located at a first location on the quality label and a coloring agent pathway located adjacent to the first location, the coloring agent pathway being operative, following the activation of the quality label, to allow the coloring agent to move, at a rate which is at least partially a function of time, from the first location to the first and second colorable areas simultaneously for simultaneous coloring thereof upon exceedance of the temperature threshold, thereby causing the first barcode to become unreadable and at the same or close to the same time causing the second barcode to become machine-readable.

Preferably, the method also includes providing an actuator element for activating the quality label.

Preferably, the actuator element includes a displaceable pull strip.

Preferably, the first visual appearance includes the thermochromic ink being of a first color and the second visual appearance includes the thermochromic ink being of a second color, different to the first color.

Preferably, the first visual appearance is visible and the second visual appearance is at least partially invisible.

Alternatively, the first visual appearance is at least partially invisible and the second visual appearance is visible.

In accordance with a preferred embodiment of the method of the present invention, the visual appearance of the thermochromic ink reversibly changes between the first visual appearance at temperatures less than or equal to the activation temperature and the second visual appearance at temperatures above the activation temperature.

Preferably, the thermochromic ink changes from the first visual appearance to the second visual appearance at a temperature generally equal to the activation temperature.

Alternatively, the thermochromic ink changes from the first visual appearance to the second visual appearance at a temperature below the activation temperature.

Preferably, the thermochromic ink indicia include human-readable indicia.

Additionally or alternatively, the thermochromic ink indicia include machine-readable indicia.

Preferably, the thermochromic ink indicia include at least one barcode.

In accordance with another preferred embodiment of the method of the present invention, the method also includes reading the barcoded indicator prior to the activating, reading the barcode including the thermochromic ink indicia following the reading of the barcoded indicator and prior to the activating, upon the barcode including the thermochromic ink indicia indicating the quality label to be at a temperature less than or equal to the activation temperature, activating the quality label and reading the barcoded indicator following the activating.

In accordance with yet another preferred embodiment of the method of the present invention, the at least one barcode includes a first barcode being machine-readable at temperatures less than or equal to the activation temperature and unreadable at temperatures greater than the activation temperature and a second barcode being unreadable at temperatures less than or equal to the activation temperature and machine-readable at temperatures greater than the activation temperature.

Preferably, the second location is directly located on the quality label.

Alternatively, the second location is not directly located on the quality label.

There is further provided in accordance with yet another preferred embodiment of the present invention an arrangement for indicating exceedance of a temperature threshold by an item including an item sensitive to exceedance of the temperature threshold and an activatable quality label applied to the item, the activatable quality label including a readable indicator located on the activatable quality label and operative, following activation of the quality label at an activation temperature, to readably indicate exceedance of the temperature threshold by the item, an actuator element operative to actuate the quality label, and indicia at least partially formed by thermochromic ink, the thermochromic ink having a first visual appearance at temperatures less than or equal to the activation temperature and a second visual appearance at temperatures above the activation temperature, such that a visual appearance of the indicia is indicative of whether the quality label is at a temperature less than or equal to the activation temperature and hence may be activated.

BRIEF DESCRIPTION OF THE DRAWINGS

The present invention will be understood and appreciated more fully from the following detailed description, taken in conjunction with the drawings in which:

FIG. 2A is a simplified schematic exploded view illustration of an activatable quality label constructed and operative in accordance with another preferred embodiment of the present invention, showing a first state thereof;

FIG. 2B is a simplified schematic assembled view illustration of the activatable quality label of FIG. 2A, showing a second state thereof;

FIGS. 4A and 4B are simplified respective schematic illustrations of first and second states of an activatable quality label constructed and operative in accordance with a further preferred embodiment of the present invention;

FIGS. 5A and 5B are simplified respective schematic illustrations of first and second states of an activatable quality label constructed and operative in accordance with yet a further preferred embodiment of the present invention;

FIGS. 6A and 6B are simplified respective schematic illustrations of first and second states of an activatable quality label, constructed and operative in accordance with yet another preferred embodiment of the present invention; and FIGS. 7A and 7B are simplified respective schematic illustrations of first and second states of a plurality of activatable quality labels, constructed and operative in accordance with a still further preferred embodiment of the present invention.

DETAILED DESCRIPTION OF PREFERRED EMBODIMENTS

Figure 1A:
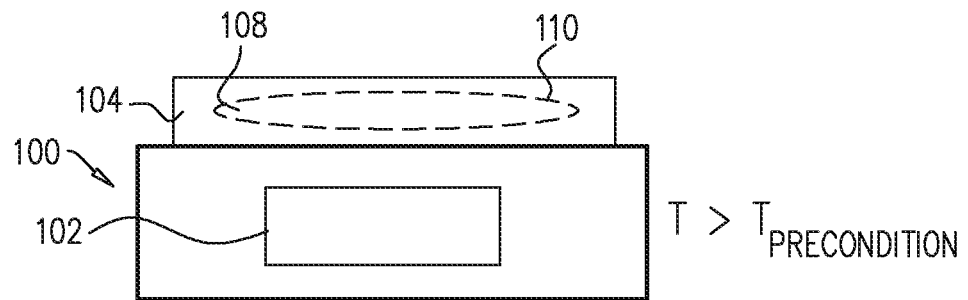
FIGS. 1A, 1B and IC are simplified respective schematic illustrations of first, second and third states of an activatable quality label constructed and operative in accordance with a preferred embodiment of the present invention.
Figure 1B:
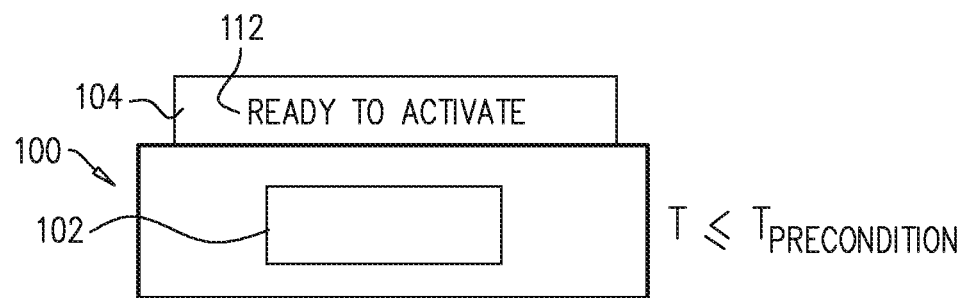
Figure 1C:
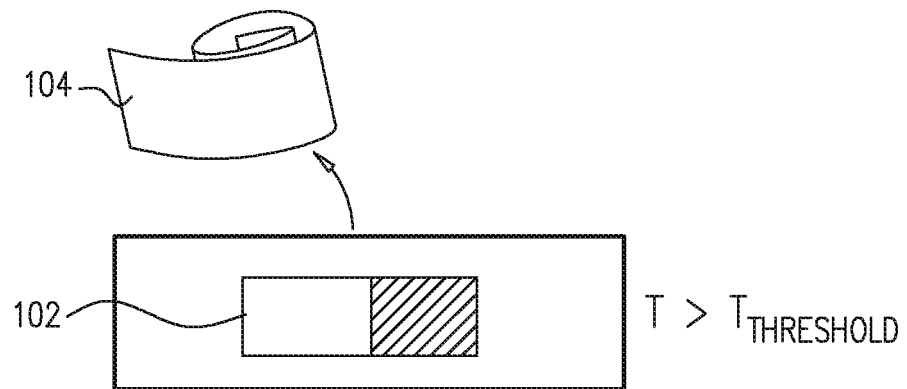

Reference is now made to FIGS. 1A, 1B and 1C, which are simplified respective schematic illustrations of first, second and third states of an activatable quality label, constructed and operative in accordance with a preferred embodiment of the present invention.

As seen in FIGS. 1A-1C, there is provided an activatable quality label 100, preferably operative to provide an indication of exceedance of a temperature threshold following activation thereof. Quality label 100 is preferably of a type requiring cooling to a given activation temperature prior to activation thereof. The process of cooling quality label 100 to at or below the activation temperature may be termed preconditioning and the activation temperature may therefore also be termed the precondition temperature of quality label 100. The terms activation temperature and precondition temperature are thus used interchangeably herein. Various types of quality labels requiring preconditioning prior to activation thereof are known in the art.

Quality label 100 may be suitable for direct or indirect application to any item benefitting from an indication of the temperature status and/or history thereof, such as, by way of example only, medical equipment, vaccines and food products. Alternatively, quality label 100 may be used to monitor ambient temperature and/or time at temperature conditions, in which case quality label 100 may be a stand-alone product adapted for independent use, without requiring application to an item to be monitored.

Quality label 100 preferably includes at least one readable indicator region 102 located thereon, readably indicating exceedance of a temperature threshold preferably following activation of the quality label 100 at or below the activation temperature of quality label 100. The temperature threshold, exceedance of which is indicated by indicator region 102, is typically greater than the precondition temperature although it is appreciated that the temperature threshold may alternatively be generally equal to the precondition temperature. Indicator region 102 may be embodied as any indicator capable of providing a readable indication of exceedance of a temperature threshold, various types of which are known in the art, including colorable temperature and time-temperature indicators.

Here, by way of example only, indicator region 102 is shown to be embodied as a colorable indicator region 102 located at a first location on a surface of quality label 100. It is appreciated that colorable region 102 is shown in a highly simplified form in FIGS. 1A-1C, for the sake of clarity and generality of presentation thereof, and that colorable region 102 may comprise more than one colorable region having a more intricate structure, including, by way of example, multiple colorable windows. It is further appreciated that colorable region 102 may additionally or alternatively form a portion of a more extensive marking or indicia. Thus, by way of example, colorable region 102 may comprise a portion of a printed barcode, as will be exemplified henceforth with reference to FIGS. 2A-7B.

Colorable region 102 is preferably adapted for coloring following activation of quality label 100 at a temperature less or equal to the precondition temperature of quality label 100 and upon exceedance of the temperature threshold. Coloring of colorable region 102 may occur by way of diffusion of a temperature-dependent coloring agent included in quality label 100 or by any other mechanism known in the art.

Quality label 100 may be activated by way of an actuator element 104, which actuator element 104 is preferably operative to actuate quality label 100 such that colorable indicator region 102 becomes operative. It is appreciated that prior to the activation of quality label 100, indicator region 102 is preferably disabled and is generally non-responsive to changes in temperature. Actuator element 104 may be embodied as a displaceable strip for activating quality indicator 100 upon displacement thereof, as shown herein by way of example. It is understood, however, that actuator element 104 may comprise any element and/or mechanism suitable for activating quality label 100, including rigid, flexible, film and/or foil elements as are known in the art.

It is appreciated that in order for quality label 100 to provide an accurate and reliable indication of exceedance of a predetermined temperature threshold by an item to which quality label 100 may be affixed, quality label 100 is required to be activated only following being cooled to a temperature less than or equal to the activation temperature of quality label 100. Quality label 100 must therefore be preconditioned to a temperature less than or equal to the activation temperature prior to activation thereof. Should quality label 100 be activated without cooling and at a temperature above the precondition temperature, the reading provided by indicator region 102 may not be an accurate indication of possible exceedance of the temperature threshold by the item or environment with which quality label 100 is associated.

In order to facilitate activation of quality label 100 at a temperature less than or equal to the activation temperature, quality label 100 preferably includes indicia at least partially formed by thermochromic ink. The thermochromic ink forming the indicia preferably has a first visual appearance at temperatures less than or equal to the activation temperature and a second visual appearance, different to the first visual appearance, at temperatures above the activation temperature, the visual appearance of the indicia thus indicating whether quality label 100 is at or below the activation temperature and hence may be actuated.

Referring now to a first state of quality label 100 shown in FIG. 1A, quality label 100 is at a temperature T above the activation temperature $T_{precondition}$ and thus not ready for activation. A thermochromic ink indicium may be printed on actuator element 104 in a region 108 thereon. Here, region 108 within which thermochromic ink indicium is located is generally indicated by a boundary 110. It is appreciated, however, that boundary 110 is a conceptual boundary only and does not correspond to a visible, physical boundary on actuator element 104. As evident from consideration of the appearance of actuator element 104 in FIG. 1A, the thermochromic ink indicium is not visible when quality label 100 is in this temperature state. It is appreciated that in this first state of quality label 100, prior to activation thereof, colorable indicator region 102 is generally non-responsive to changes in temperature and here, by way of example, is shown to be clear.

Upon label 100 being cooled or preconditioned to a temperature less than or equal to $T_{precondition}$, corresponding to a second state of label 100 shown in FIG. 1B, a thermochromic ink indicium 112 printed on actuator element 104 in region 108 thereof becomes visible. In this case, by way of example, the thermochromic ink indicium 112 may be a printed text reading 'READY TO ACTIVATE' upon label 100 being cooled to a temperature below the precondition temperature.

By way of example, the thermochromic ink marking 112 may comprise an ink having a white color at a temperature above $T_{precondition}$ and having a blue color at a temperature less than or equal to $T_{precondition}$. In the case that actuator element 104 is of a white color in region 108, the thermochromic ink marking 112 is thus not visible in region 108 at a temperature above $T_{precondition}$ since the color of the ink is generally the same as the background color of the region on which the ink is located. Actuator element 104 thus appears to be blank, as seen in FIG. 1A. Following preconditioning, at a temperature less than or equal to $T_{precondition}$, the thermochromic ink becomes blue and therefore readable, as seen in FIG. 1B.

Additionally by way of example, the thermochromic ink marking 112 may comprise an ink that is transparent at a temperature above $T_{precondition}$ and of a black or grey color at a temperature less than $T_{precondition}$. In this case, the thermochromic ink marking 112 is transparent and thus not visible in region 108 at a temperature above $T_{precondition}$ as seen in FIG. 1A, and becomes visible and hence readable upon being cooled to a temperature less than or equal to $T_{precondition}$, as seen in FIG. 1B. An advantage of using thermochromic ink that is transparent rather than colored at temperatures greater than $T_{precondition}$, is that the thermochromic ink indicia 112 will not visible at temperatures above $T_{precondition}$ independent of the color of the surface on which the thermochromic ink indicia 112 are formed.

As seen in FIG. 1B, the thermochromic ink 112 may display a human-readable textual message instructing a user that label 100 is ready to activate. It is appreciated that thermochromic ink 112 may alternatively be printed or otherwise formed on actuator element 104 so as to display a machine readable message indicating that label 100 is ready to activate, as will be exemplified henceforth.

Thermochromic ink indicium 112 may be at least partially invisible at temperatures less than or equal $T_{precondition}$, as shown to be the case in FIG. 1A in which indicia 112 are invisible, and may become visible at temperatures above $T_{precondition}$. Alternatively, indicia 112 may be visible at temperatures less than or equal to $T_{precondition}$ and become at least partially invisible at temperatures above $T_{precondition}$ and the message displayed thereby modified accordingly, as will be exemplified henceforth.

Following an indication by thermochromic ink indicia 112 of label 100 having been preconditioned and being at or below $T_{precondition}$, quality label 100 may be activated, as seen in FIG. 1C. Here, by way of example, quality label 100 is shown to be activated by removal of activation element 104 therefrom. Upon removal of activation element 104 from label 100, colorable indicator region 102 preferably becomes active and responsive to changes in temperature and thus capable of indicating exceedance of a temperature threshold $T_{threshold}$. As seen in FIG. 1C showing quality label 100 in a third state, at a temperature above the temperature threshold, colorable region 102 may change from clear to colored, thus providing a readable visual indication of exceedance of the temperature threshold.

Preferably, the thermochromic ink forming indica 112 is of a reversible type, such that following a change of color upon being preconditioned and cooled to at or below a precondition temperature, the thermochromic ink may revert to its previous color upon exceedance thereof. Thus, as seen in FIG. 1C, the message 'READY TO ACTIVATE' is no longer visible upon actuation element 104, due to actuation element 104 now having returned to a temperature above $T_{precondition}$ and the thermochromic ink indicia 112 therefore having resumed the same appearance as in the first state thereof, corresponding to that shown in FIG. 1A.

The use of reversible thermochromic ink may be particularly advantageous when quality label 100 is used in fluctuating temperature conditions, since this allows indicia 112 to reversibly change appearance multiple times during preconditioning and prior to activation of quality label 100 by a user. Reversible thermochromic inks suitable for use in the present invention are commercially available from a variety of manufacturers, including 'B and H Color Change' of Flintshire, UK and 'Chromatic Technologies, Inc.' of Colorado, USA.

It is appreciated that the thermochromic ink used to form indicia 112 may be selected so as to be of a type undergoing a change in visual appearance, such as a color change, at a temperature generally equal to the precondition temperature of label 100 or of a type undergoing a visual change, such as a color change, at a temperature several degrees below the precondition temperature. so as to provide an error margin in the activation of label 100.

Thermochromic ink indicia 112 may be formed at a variety of locations on label 100 by way of printing, stamping or other means as are well known in the art. It is appreciated that the location of region 108 and indicia 112 on actuator element 104 shown in FIG. 1B is by way of example only, and that indicia 112 may alternatively be formed at a variety of other locations on the body of label 100. It is further appreciated that indicia 112 are not necessarily directly formed on label 100 and may alternatively be formed on another surface separate from but associated with label 100, as will be exemplified henceforth with reference to FIGS. 7A and 7B.

It is appreciated that quality label 100 thus preferably includes two distinct indicators, the first indicator being the thermochromic ink indicia 112 indicating quality label to be preconditioned to a temperature less than or equal to a precondition temperature of quality label 100 and thus ready for activation, the second indicator being indicator region 102. Indicator region 102 is preferably activated by a user in response to the indication of readiness for activation by the first thermochromic indicator 112. Upon indicator region 102 being activated, indicator region 102 provides an indication of exceedance of a threshold temperature by the quality label 100 itself or by an item to which quality label 100 may be affixed, in order to monitor the temperature status thereof.

Reference to now made to FIG. 2A, which is a simplified schematic exploded view illustration of an activatable quality label constructed and operative in accordance with another preferred embodiment of the present invention, showing a first state thereof, and to FIG. 2B, which is a simplified schematic assembled view illustration of the activatable quality label of FIG. 2A, showing a second state thereof.

As seen in FIG. 2A, there is provided a quality label 200, preferably operative to provide an indication of exceedance of a temperature threshold following activation thereof. Quality label 200 is preferably of a type requiring cooling to a given activation temperature prior to activation thereof. The process of cooling quality label 200 to at or below the activation temperature may be termed preconditioning and the activation temperature may therefore also be termed the precondition temperature of quality label 200.

Quality label 200 preferably includes at least one indicator region 202 operative to readably indicate exceedance of a temperature threshold following activation of the quality label 200 at or below the activation temperature of quality label 200. The temperature threshold, exceedance of which is indicated by indicator region 202, is typically greater than the precondition temperature although it is appreciated that the temperature threshold may alternatively be generally equal to the precondition temperature. Here, indicator region 202 is shown to be embodied as a barcoded indicator region 202 including multiple colorable regions 204 forming part of a multiplicity of barcodes 206. Barcodes 206 may be printed on a barcode defining layer 208, preferably formed on a transparent substrate. It is appreciated that the particular configuration of barcodes 206 is illustrative only and that the scope of the present invention includes any other type of barcodes comprising colorable regions, as are known in the art.

Colorable regions 204 are preferably adapted for coloring following activation of quality label 200 at a temperature less than or equal to the precondition temperature and upon exceedance of the temperature threshold. Coloring of colorable regions 204 may occur by way of diffusion of a temperature-dependent coloring agent 210 located at a first location on quality label 200 along a coloring agent pathway 212 adjacent thereto.

Quality label 200 may be activated by way of an actuator element, here embodied as an actuation pull strip 220. Actuation pull strip 220 is preferably operative to activate quality label 200 such that barcoded indicator region 202 becomes operative and responsive to temperature changes. It is appreciated that prior to the activation of quality label 200, barcoded indicator region 202 is preferably generally non-responsive to changes in temperature and barcodes 206 may be unreadable. Actuation pull strip 220 may be embodied as a displaceable pull strip for actuating quality label 200 upon removal thereof.

Quality label 200 is generally of type described, inter alia, in U.S. Pat. No. 8,091,776 of the applicant, which is incorporated herein by reference. Thus, multiplicity of barcodes 206 may include a first barcode including at least one first colorable area, the first barcode being machine-readable before exceedance of the temperature threshold and at least a second barcode including at least one second colorable area, the second barcode not being machine-readable before exceedance of the temperature threshold. Coloring agent pathway 212 may be operative, following activation of quality label 200, to allow coloring agent 210 to move, at a rate which is at least partially a function of time, from the first location to the first and second colorable areas simultaneously for simultaneous coloring thereof upon exceedance of the temperature threshold, thereby causing the first barcode to become unreadable and at the same or close to the same time causing the second barcode to become machine-readable.

It is appreciated that in order for quality label 200 to provide an accurate and reliable indication of exceedance of a predetermined temperature threshold by an item to which quality label 200 may be affixed, quality label 200 is required to be activated at a temperature less than or equal to the activation temperature of quality label 200. Quality label 200 must therefore be preconditioned to a temperature less than or equal to the activation temperature prior to activation thereof. Should quality label 200 be activated at a temperature above the precondition temperature, the reading provided by colorable barcodes 206 of indicator region 202 may not be an accurate indication of possible exceedance of the temperature threshold by the item or environment with which quality label 200 is associated.

In order to facilitate activation of quality label 200 at a temperature below the precondition temperature, quality label 200 preferably includes indicia at least partially formed by thermochromic ink. The thermochromic ink comprising the readable indicia preferably has a first visual appearance at temperatures less than or equal to the activation temperature of label 200 and a second visual appearance above the activation temperature, such that the indicia is readable to indicate whether label 200 is below the activation temperature and thus may be activated.

Referring now to a first exploded view of quality label 200 in FIG. 2A, quality label 200 is in a first state at a temperature T above the activation temperature $T_{precondition}$ and thus not ready for activation. A thermochromic ink indicium may be printed on actuator element 220 in a region 222 thereof. As evident from consideration of the appearance of actuator element 220 in FIG. 2A, the thermochromic ink indicium is not visible when quality label 200 is in this temperature state.

Upon label 200 being cooled or preconditioned to a temperature less than or equal to $T_{precondition}$, corresponding to a second state of label 200 shown in a second assembled view of quality label 200 in FIG. 2B, thermochromic ink indicia 230 printed on actuation pull strip 220 in region 222 thereof become visible. In this case, by way of example, the thermochromic ink indicia 230 may be a printed text reading 'OK TO ACTIVATE' when at a temperature below the precondition temperature.

By way of example, the thermochromic ink marking 230 may comprise an ink having a white color at a temperature above $T_{precondition}$ and having a blue color at a temperature less than or equal to $T_{precondition}$. In the case that actuation pull strip 220 is of a white color in region 222, the thermochromic ink marking 230 is thus not visible in region 222 at a temperature above $T_{precondition}$ since the color of the ink is generally the same as the background color of the region on which the ink is located. Actuation pull strip 220 thus appears to be blank, as seen in FIG. 2A. At a temperature less than or equal to $T_{precondition}$, the thermochromic ink becomes blue and therefore readable, as seen in FIG. 2B.

Alternatively, the thermochromic ink marking 230 may comprise an ink that is transparent at temperatures above $T_{precondition}$ and of a black or grey color at temperatures less than or equal to $T_{precondition}$, in which case the thermochromic ink marking 230 will not be visible in region 222 at a temperature above $T_{precondition}$, independent of the background color of region 222.

In this case, by way of example, the thermochromic ink indicia 230 display a human-readable textual message instructing a user that label 200 is preconditioned and ready to activate. Consequently, label 200 may be activated by removal of actuator element 220 therefrom, thus rendering indicator region 202 active and responsive to changes in temperature.

It is appreciated that the thermochromic ink indicia 230 may alternatively be printed or otherwise formed on actuator element 220 so as to display a machine-readable message indicating that indicator 200 is ready to activate, as will be exemplified henceforth.

Thermochromic ink indicia 230 may be at least partially invisible at temperatures less than or equal to $T_{precondition}$, as shown to be the case in FIG. 2A in which indicia 230 are invisible, and may become visible at temperatures above $T_{precondition}$. Alternatively, indicia 230 may be visible at temperatures less than or equal to $T_{precondition}$ and become at least partially invisible at temperatures above $T_{precondition}$ and the message displayed thereby modified accordingly, as will be exemplified henceforth.

Preferably, the thermochromic ink is of a reversible type, such that following a change of color upon quality label being cooled to a temperature at or below the precondition temperature, the thermochromic ink may revert to its previous color upon exceedance thereof. Reversible thermochromic inks of these types are commercially available from a variety of manufacturers, including 'B and H Color Change' of Flintshire, UK and 'Chromatic Technologies, Inc.' of Colorado, USA.

The thermochromic ink used to form indicia 230 may be selected so as to be of a type undergoing a change in visual appearance, such as a color change, at a temperature generally equal to the precondition temperature of label 200 or of a type undergoing a visual change, such as a color change, at a temperature several degrees below the precondition temperature of label 200, so as to provide an error margin in activation of label 200.

Thermochromic ink indicia 230 may be formed at a variety of locations on label 200 by way of printing, stamping or other means as are well known in the art. It is appreciated that the location of region 222 and indicia 230 on actuator element 220 shown in FIG. 2B is by way of example only, and that indicia 230 may alternatively be formed at a variety of other locations on the body of label 200. It is further appreciated that indicia 230 are not necessarily directly formed on label 200 and may alternatively be formed on another surface separate from but associated with label 200, as will be exemplified henceforth with reference to FIGS. 7A and 7B.

It is appreciated that quality label 200 thus preferably includes two distinct indicators, the first indicator being the thermochromic ink indicia 230 indicating quality label to be preconditioned to a temperature less than or equal to a precondition temperature of quality label 200 and thus ready for activation, the second indicator being colorable barcoded regions 206 of indicator region 202. Indicator region 202 is preferably activated by a user in response to the indication of readiness for activation by the first thermochromic indicator 230. Upon indicator region 202 being activated, indicator region 202 provides an indication of exceedance of a threshold temperature by the quality label 200 itself or by an item to which quality label 200 may be affixed, in order to monitor the temperature status thereof.

Figure 3B:
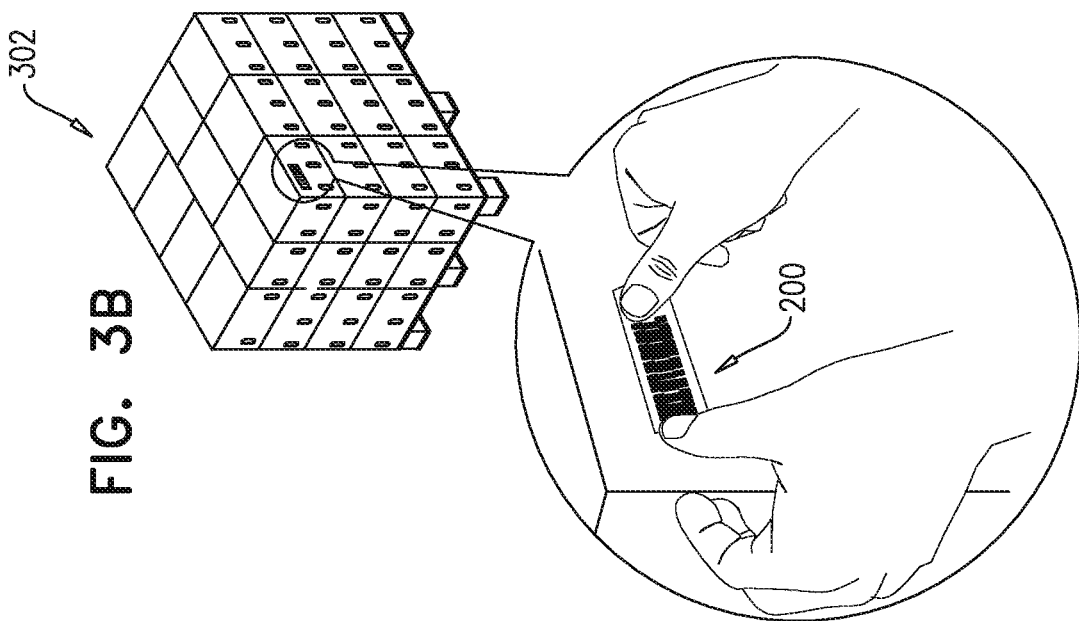
FIGS. 3A and 3B are simplified pictorial illustrations of steps in the activation and application of an activatable quality label of the type shown in FIGS. 2A and 2B.
Figure 3A:
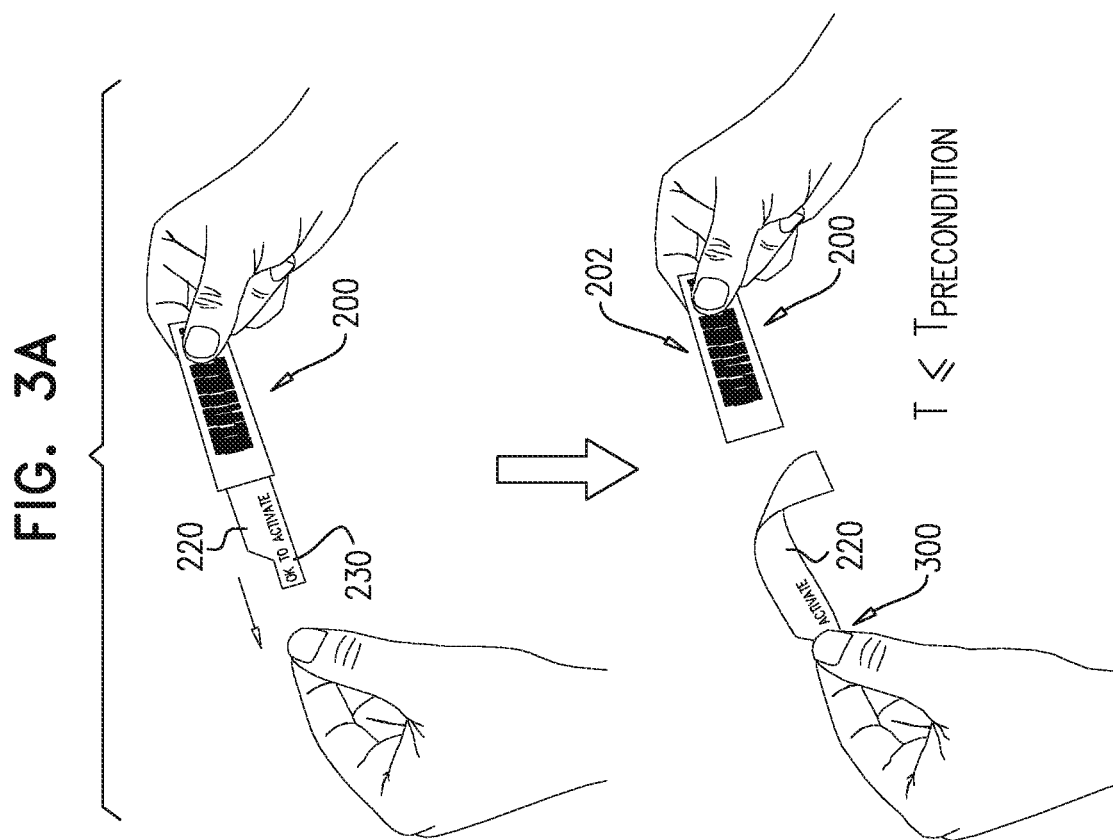

Reference is now made to FIGS. 3A and 3B, which are simplified pictorial illustrations of steps in the activation of an activatable quality label of the type shown in FIGS. 2A and 2B.

As seen in FIG. 3A, at a temperature T less than or equal to $T_{precondition}$ thermochromic ink indicia 230 on quality label 200 display a visual indication of quality label 200 having been preconditioned and hence being ready for activation. Here, by way of example, thermochromic ink indicia 230 on actuation pull strip 220 display a human-readable message 'OK TO ACTIVATE'. Upon display of this message, a user may remove actuation pull strip 220 by pulling thereon, as indicated by a numeral 300, so as to render quality label 200 active and barcoded indicator region 202 responsive to changes in temperature.

As seen in FIG. 3B, subsequent to removal of actuation pull strip 220 and consequent activation of quality label 200, quality label 200 may be applied by the user to an item to be monitored, such as an item 302. Item 302 is a temperature-sensitive item, sensitive to exceedance of the threshold temperature. Following the application of quality label 200 to item 302, indicator region 202 is preferably operative to readably indicate exceedance of the temperature threshold by item 302.

It is understood that the steps in activation of quality label 200 shown in FIGS. 3A and 3B are not required to be performed in the sequence shown and may alternatively be reversed. Thus, quality label 200 may first be applied to item 302, as shown in FIG. 3B and only subsequently be activated, as shown in FIG. 3A. Furthermore, it is understood that the step of application of quality label 200 to a temperature-sensitive item to be monitored may be obviated if quality label 200 is to be used as an ambient quality indicator. Additionally, it is appreciated that although the steps in activation of a quality label of the present invention are illustrated in FIGS. 3A and 3B with respect to quality label 200, these steps may be applied to any quality label constructed and operative in accordance with preferred embodiments of the present invention, with modifications and/or additional steps as may be required.

It will be appreciated that the particular configurations and visual appearances of thermochromic ink indicia 212, 230 at temperatures above and below the precondition temperature, as shown in FIGS. 1A-3A, are illustrative only and that a large variety of alternative configurations of thermochromic ink indicia indicating satisfaction of preconditioning requirements and hence readiness for activation of quality labels of the present invention, are also possible.

Thus, by way of example as seen in FIG. 4A, when quality label 200 is in a first state at a temperature T above the precondition temperature $T_{precondition}$ and thus not ready for activation, thermochromic ink indicia 430 may be configured to display a message 'NOT OK TO ACTIVATE'.

The word 'NOT' may be printed using regular, non-thermochromic ink in a region 442 of actuator element 220 on a background region 444, background region 444 being formed of thermochromic ink. By way of example, the thermochromic ink used to form background region 444 may be white at temperatures above the precondition temperature and may turn blue at temperatures less than or equal to the precondition temperature. The word 'NOT' may be printed in blue ink. Additional text 'OK TO ACTIVATE' may be printed adjacent to the word 'NOT' in regular, non-thermochromic ink.

At temperatures above $T_{precondition}$, as seen in FIG. 4A, the word 'NOT' in blue is visible against the white thermochromic ink background 444 and indicator 200 therefore bears the indicia 'NOT OK TO ACTIVATE'. Upon indicator 200 being cooled to a temperature less than or equal to $T_{precondition}$, corresponding to a state of indicator 200 shown in FIG. 4B, the word 'NOT' is no longer visible since the thermochromic ink forming background 444 has assumed a blue color, thus masking the presence of the blue text 'NOT'.

The indicator, once cooled to a temperature equal to or less than the precondition temperature, hence bears the text 'OK TO ACTIVATE'.

It will be appreciated that thermochromic ink indicia 230, 430 on actuator element 220 is not limited to being a human-readable indicia. Thus, as shown in FIGS. 5A and 5B, thermochromic ink may be used to form a barcoded thermochromic ink indicia 550 on actuator element 220 alongside the text message 430. Barcoded thermochromic ink indicia 550 may become machine-readable at temperatures less than or equal to the precondition temperature, as seen in FIG. 5B. A particular advantage of the embodiment shown in FIGS. 5A and 5B is that the barcoded thermochromic ink indicia 550 is machine-readable and thus may be read by means of a barcode scanner so as to confirm correct activation of the label 200.

In a particularly preferred embodiment of the present invention, barcode 550 may be read sequentially with barcodes 206 in order to verify that quality label 200 was correctly preconditioned prior to activation thereof and hence that the reading provided by quality label 200 is accurate.

By way of example, a barcode scanner may be used to scan barcodes 206, prior to activation of quality label 200. Prior to activation of quality label 200 barcodes 206 are preferably indicative that quality label 200 has not yet been activated, either by being unreadable or by at least one of multiplicity of barcodes 206 being readable. The reading of barcodes 206 thus may be used to confirm that quality label 200 has not yet been activated.

Following the scanning of barcodes 206, barcode 550 may be scanned, in order to confirm that quality label 200 has been cooled to the precondition temperature and may be activated. Upon confirmation that quality label 200 has been correctly preconditioned and is at a temperature at or below the precondition temperature, quality label 200 may be activated by removal of actuation pull strip 220.

Subsequently, following activation, barcodes 206 may again be scanned by a barcode scanner. Following activation of quality label 200 barcodes 206 are preferably indicative that quality label has been activated, due to a change in at least one of multiplicity of barcodes 206 upon activation of quality label 200. The post-activation reading of barcodes 206 thus may confirm that quality label 200 has been activated.

The barcode scanner may record the time at which barcode 550 is read and the time at which barcodes 206 are subsequently read, following activation. Provided that only a short time has been found to elapse between the reading of barcode 550 followed by barcodes 206, it may be assumed that no significant change in temperature of quality label 200 occurred between the two readings, thereby verifying that quality label 200 was activated at or below the required precondition temperature and that the reading provided by quality label 200 is hence reliable.

In order to facilitate the above-described verification of correct activation of quality label 200 by sequential reading of barcode 550 in conjunction with barcodes 206, barcode 550 may be stored in a database and is preferably unique to the quality label with which it is associated.

In one preferred embodiment, the barcoded thermochromic indicia 550 may be at least partially invisible at temperatures above $T_{precondition}$, as shown in FIG. 5A, and may become visible only upon indicator 200 being cooled to a temperature at or below $T_{precondition}$, as shown in FIG. 5B. Alternatively, barcoded thermochromic indicia 550 may be at least partially invisible at temperatures less than or equal to $T_{precondition}$ and become visible at temperatures greater than $T_{precondition}$. Barcoded indicia 550 may be applied in conjunction with a human readable text message, such as message 430 as shown in FIGS. 5A and 5B. Alternatively, barcoded thermochromic indicia 550 may replace the human readable text message.

Barcoded thermochromic indicia 550 are not limited to comprising a single barcode. As seen in FIGS. 6A and 6B, a thermochromic barcoded region located on indicator 200 may include a first barcode 650 seen in FIG. 6A and a second barcode 660, seen in FIG. 6B, both of which first and second barcodes 650 and 660 are at least partially formed by thermochromic ink. One of barcodes 650 and 660, for example barcode 650, may be formed by thermochromic ink so as to be visible only at temperatures above the precondition temperature, for example above 0° C. The other one of barcodes 650 and 660, for example barcode 660, may be formed of a different type of thermochromic ink being visible only at temperatures less than the precondition temperature, for example below −3° C. The reading of either one of barcodes 650 or 660 with a barcode scanner therefore may be used to indicate whether the quality label has been preconditioned to the precondition temperature and hence is ready for activation.

In a particularly preferred embodiment of the present invention, barcodes 650 and 660 may be read sequentially with barcodes 206 in order to verify that quality label 200 was correctly preconditioned prior to activation thereof and hence that the reading provided by quality label 200 is accurate.

By way of example, a barcode scanner may be used to scan barcodes 206, prior to activation of quality label 200. Prior to activation of quality label 200 barcodes 206 are preferably indicative that quality label 200 has not yet been activated, either by being unreadable or by at least one of multiplicity of barcodes 206 being readable. The reading of barcodes 206 thus may be used to confirm that quality label 200 has not yet been activated.

Following the scanning of barcodes 206, barcode 650/660 may be scanned, in order to confirm that quality label 200 has been cooled to the precondition temperature and may be activated. The reading of barcode 660 may confirm that quality label 200 has been correctly preconditioned and is at a temperature at or below the precondition temperature. Quality label 200 may then be activated by removal of actuation pull strip 220.

Subsequently, following activation, barcodes 206 may again be scanned by a barcode scanner. Following activation of quality label 200 barcodes 206 are preferably indicative that quality label has been activated, by a change in at least one of multiplicity of barcodes 206. The post-activation reading of barcodes 206 thus may confirm that quality label 200 has been activated.

The barcode scanner may record the time at which barcode 660 is read and the time at which barcodes 206 are subsequently read, following activation. Provided that only a short time has been found to elapse between the reading of barcode 660 followed by barcodes 206, it may be assumed that no significant change in temperature of quality label 200 occurred between the two readings, thereby verifying that quality label 200 was activated at or below the required precondition temperature and that the reading provided by quality label 200 is hence reliable.

In order to facilitate the above-described verification of correct activation of quality label 200 by sequential reading of barcodes 650/660 in conjunction with barcodes 206, barcodes 650/660 may be stored in a database and are preferably unique to the quality label with which they are associated.

It is appreciated that it is possible that at a given temperature, such as for example, −2° C., both of barcodes 650 and 660 may be visible and hence readable or alternatively both of barcodes 650 and 660 may be invisible and hence unreadable. In this case, a message may be displayed on the screen of the barcode scanner indicating that the quality label requires further cooling in order for the quality label 200 to be accurately activated.

It is appreciated that thermochromic barcoded regions 550, 650 and 660, preferably correspond to standard machine readable barcodes of types well known in the art. It is further appreciated that barcoded regions 550, 650 and 660 may be used in conjunction with human-readable text thermochromic ink indicia messages, such as 'OK TO ACTIVATE' as shown in FIGS. 4A-5B, or may be used without the presence of other additional thermochromic ink indicia.

It is additionally appreciated that the thermochromic ink used to form the barcoded thermochromic indicia may be selected so as to be of a type undergoing a color change at a temperature generally equal to the precondition temperature of the label or of a type undergoing a color change at a temperature several degrees below the precondition temperature of the label, so as to provide an error margin in activation of quality label 200.

Thermochromic ink indicia may be formed at a variety of locations on quality label 200 by way of printing, stamping or other means as are well known in the art. It is appreciated that the location of the indicia on actuator element 220 as shown in FIGS. 2A-6B is by way of example only, and that the indicia may alternatively be formed at other locations on the body of label 200. Thus, by way of example, all or some of barcodes 206 may be printed using thermochromic ink, such that an appearance of at least one of barcodes 206 is machine readably indicative of whether quality indicator 200 is below the precondition temperature and hence may be activated. Additionally, a thermochromic ink text such as 'TEMPERATURE OK' may be printed on barcode defining layer 208, which text may become visible only at temperatures below the precondition temperature, so as to readably indicate the present temperature of the quality indicator.

It is appreciated that the invention described herein may be incorporated in any type of quality label or quality indicator. Particularly preferably, the invention described herein may be incorporated in one of the barcodes described in any one of related applications U.S. Pat. Nos. 7,562,811; 8,091,776; 8,807,422; 8,579,193; 8,540,156; 8,528,808; 8,196,821; 8,950,664; 8,500,014; and U.S. Published Patent Application Nos. 2011/0006109; 2014/0353385; 2014/0252096; 2015/0053776; 2012/0145781; 2013/0334301; and 2012/0104105, all of which are incorporated by reference, with any such modifications as may be obvious to one skilled in the art.

Reference is now made to FIGS. 7A and 7B, which are simplified respective schematic illustrations of first and second states of a plurality of activatable quality labels, constructed and operative in accordance with a still further preferred embodiment of the present invention.

As seen in FIG. 7A, a multiplicity of activatable quality labels 200 may be housed in a container 702. Here, by way of examples, multiplicity of quality labels 200 is seen to comprise a large number of individual quality labels of a type generally resembling those shown in FIGS. 2A-6B. It is appreciated, however, that multiplicity of quality labels 200 may comprise any type of activatable quality label requiring preconditioning prior to activation and including a readable indicator readably indicating exceedance of a temperature threshold following activation of the quality label.

In the case of a large number of quality labels such as shown in FIG. 7A the cooling of the quality labels to below the precondition temperature prior to activation thereof may be performed on the multiplicity of quality labels 200 simultaneously. In such a case, it may be advantageous for the thermochromic ink indicia indicating readiness of the quality labels for activation below the precondition temperature to be located on container 702 rather than directly applied to each individual quality label.

In accordance with one possible preferred embodiment of the present invention, thermochromic ink indicia 712 may be applied to the outside of container 702 at a location 714. As seen in FIG. 7A, when multiplicity of quality labels 200 is at a temperature above $T_{precondition}$ the thermochromic indicia 712 may be visible and may display a human-readable message indicating that preconditioning is required. By way of example, the thermochromic ink indicia 712 may comprise an ink having a white color at a temperature less than or equal to $T_{precondition}$ and having a blue color at a temperature above $T_{precondition}$. In the case that container 702 is of a white color in region 714, the thermochromic ink marking 712 thus is visible in region 714 when container 702 is at a temperature above $T_{precondition}$ since the color of the ink forms a contrast with the background color of the region on which the ink is located.

As seen in FIG. 7B, when multiplicity of quality labels 200 is cooled to a temperature less than or equal to $T_{precondition}$ thermochromic ink indicia 712 may become invisible, since the white color of the indicia 712 at these temperatures is generally the same as the white background in region 714.

It is understood that alternatively thermochromic ink indicia may be applied of the converse type so as to only become visible at temperatures equal to or less than the activation temperature. In this case, the thermochromic ink indicia may read, for example, 'LABELS READY FOR USE', which marking would become invisible upon container 702 exceeding the precondition temperature and changing of the color of the thermochromic ink.

Preferably, the thermochromic ink forming indicia 712 is of a reversible type, such that following a change of color thereof upon container 702 being cooled to at or below the precondition temperature, the thermochromic ink may revert to its previous color upon exceedance of the precondition temperature. Reversible thermochromic inks suitable for use with embodiments of the present invention are commercially available from a variety of manufacturers, including 'B and H Color Change' of Flintshire, UK and 'Chromatic Technologies, Inc.' of Colorado, USA.

Optionally, the indication of readiness for activation below the precondition temperature provided by thermochromic indicia 712, may be augmented by an electronic mechanism indicating readiness for activation of multiplicity of quality labels 200. By way of example, as shown here, an electronic circuit 720 may be appended to container 702 for the purpose of measuring temperature and/or time at temperature of container 702 and hence of multiplicity of labels 200 therein.

When multiplicity of labels 200 is ready for activation in accordance with a given formulation or decision table of temperature and/or time at temperature values as measured by electronic circuit 720, such readiness for activation may be indicated. For example, a lock 730 located on container 702 and cooperatively coupled to electronic circuit 720 may be unlocked. Other indications of readiness for activation of quality labels 200, as measured by electronic circuit 720, may include the switching on or off of a light or the display of a digital message.

It is appreciated that thermochromic ink indicia 712 formed on container 702 are not limited to displaying a human-readable message and may alternatively comprise a machine-readable message, such as a barcode. Such a thermochromic barcode may change from a first readable state at a temperature below $T_{precondition}$ to a second readable state at a temperature above $T_{precondition}$. Alternatively, such a thermochromic barcode may be invisible at temperatures above $T_{precondition}$ and may become visible upon container 702 being cooled to a temperature below $T_{precondition}$, or the reverse.

It will be appreciated by persons skilled in the art that the present invention is not limited by what has been particularly claimed hereinbelow. Rather, the scope of the invention includes various combinations and subcombinations of the features described hereinabove as well as modifications and variations thereof as would occur to persons skilled in the art upon reading the forgoing description with reference to the drawings and which are not in the prior art.

The invention claimed is:

1. An activatable quality label operative to provide an indication of exceedance of a temperature threshold following activation thereof at a temperature less than or equal to an activation temperature, comprising:
    a readable indicator located on said quality label and operative, following activation of said quality label at or below said activation temperature, to readably indicate exceedance of said temperature threshold;
    an actuator element operative to activate said quality label; and
    indicia at least partially formed by thermochromic ink, said indicia formed on said activatable quality label, said thermochromic ink having a first visual appearance at temperatures less than or equal to said activation temperature and a second visual appearance at temperatures above said activation temperature, such that a visual appearance of said indicia is indicative of whether said quality label is at a temperature less than or equal to said activation temperature and hence may be activated.

2. An activatable quality label according to claim 1, wherein said readable indicator comprises a human-readable indicator.

3. An activatable quality label according to claim 1, wherein said readable indicator comprises a machine-readable indicator.

4. An activatable quality label according to claim 3, wherein said readable indicator comprises a barcoded indicator.

5. An activatable quality label according to claim 4, wherein said barcoded indicator comprises a multiplicity of barcodes, said multiplicity of barcodes comprising:
    a first barcode comprising at least one first colorable area, said first barcode being machine-readable before exceedance of said temperature threshold;
    at least a second barcode comprising at least one second colorable area, said second barcode not being machine-readable before exceedance of said temperature threshold;
    a coloring agent located at a first location on said quality label; and
    a coloring agent pathway located adjacent to said first location, said coloring agent pathway being operative, following said activation of said quality label, to allow said coloring agent to move, at a rate which is at least partially a function of time, from said first location to said first and second colorable areas simultaneously for simultaneous coloring thereof upon exceedance of said temperature threshold, thereby causing said first barcode to become unreadable and at the same or close to the same time causing said second barcode to become machine-readable.

6. An activatable quality label according to claim 1, wherein said first visual appearance comprises said thermochromic ink being of a first color and said second visual appearance comprises said thermochromic ink being of a second color, different to said first color.

7. An activatable quality label according to claim 1, wherein said visual appearance of said thermochromic ink reversibly changes between said first visual appearance at temperatures less than or equal to said activation temperature and said second visual appearance at temperatures above said activation temperature.

8. An activatable quality label according to claim 1, wherein said indicia comprise human-readable indicia.

9. An activatable quality label according to claim 1, wherein said indicia comprise machine-readable indicia.

10. An activatable quality label according to claim 9, wherein said indicia comprise at least one barcode, said at least one barcode comprising a first barcode being machine-readable at temperatures less than or equal to said activation temperature and unreadable at temperatures greater than said activation temperature and a second barcode being unreadable at temperatures less than or equal to said activation temperature and machine-readable at temperatures greater than said activation temperature.

11. A method for providing an indication of exceedance of a temperature threshold by an item, comprising:
    providing an activatable quality label, said activatable quality label having a readable indicator formed at a first location thereon and an actuator element operative to activate said activatable quality label, and thermochromic ink indicia formed at a second location with respect thereto, said readable indicator readably indicating exceedance of said temperature threshold following activation of said quality label at a temperature less than or equal to an activation temperature, said thermochromic ink indicia having a first visual appearance at temperatures less than or equal to said activation temperature and a second visual appearance at temperatures above said activation temperature, such that a visual appearance of said thermochromic ink indicia is indicative of whether said quality label is at a temperature less than or equal to said activation temperature;
    upon said thermochromic ink indicia indicating said quality label to be at a temperature less than or equal to said activation temperature, activating said quality label; and
    applying said activatable quality label to said item.

12. A method for providing an indication of exceedance of a temperature threshold by an item according to claim 11, wherein said readable indicator comprises a human-readable indicator.

13. A method for providing an indication of exceedance of a temperature threshold by an item according to claim 11, wherein said readable indicator comprises a machine-readable indicator.

14. A method for providing an indication of exceedance of a temperature threshold by an item according to claim 13, wherein said readable indicator comprises a barcoded indicator.

15. A method for providing an indication of exceedance of a temperature threshold by an item according to claim 14, wherein said barcoded indicator comprises a multiplicity of barcodes, said multiplicity of barcodes comprising:
   a first barcode comprising at least one first colorable area, said first barcode being machine-readable before exceedance of said temperature threshold;
   at least a second barcode comprising at least one second colorable area, said second barcode not being machine-readable before exceedance of said temperature threshold;
   a coloring agent located at a first location on said quality label; and
   a coloring agent pathway located adjacent to said first location, said coloring agent pathway being operative, following said activation of said quality label, to allow said coloring agent to move, at a rate which is at least partially a function of time, from said first location to said first and second colorable areas simultaneously for simultaneous coloring thereof upon exceedance of said temperature threshold, thereby causing said first barcode to become unreadable and at the same or close to the same time causing said second barcode to become machine-readable.

16. A method for providing an indication of exceedance of a temperature threshold by an item according to according to claim 14, wherein said thermochromic ink indicia comprise machine-readable indicia.

17. A method for providing an indication of exceedance of a temperature threshold by an item according to claim 16, wherein said thermochromic ink indicia comprise at least one barcode, said method also comprising:
   reading said barcoded indicator prior to said activating;
   reading said barcode comprising said thermochromic ink indicia following said reading of said barcoded indicator and prior to said activating;
   upon said barcode comprising said thermochromic ink indicia indicating said quality label to be at a temperature less than or equal to said activation temperature, activating said quality label; and
   reading said barcoded indicator following said activating.

18. A method for providing an indication of exceedance of a temperature threshold by an item according to claim 11, wherein said first visual appearance comprises said thermochromic ink being of a first color and said second visual appearance comprises said thermochromic ink being of a second color, different to said first color.

19. A method for providing an indication of exceedance of a temperature threshold by an item according to claim 11, wherein said visual appearance of said thermochromic ink reversibly changes between said first visual appearance at temperatures less than or equal to said activation temperature and said second visual appearance at temperatures above said activation temperature.

20. A method for providing an indication of exceedance of a temperature threshold by an item according to according to claim 11, wherein said thermochromic ink indicia comprise human-readable indicia.

\* \* \* \* \*